(12) United States Patent
Zhu et al.

(10) Patent No.: US 12,430,283 B2
(45) Date of Patent: Sep. 30, 2025

(54) METHODS, SYSTEMS, AND APPARATUS TO RECONFIGURE A COMPUTER

(71) Applicant: Intel Corporation, Santa Clara, CA (US)

(72) Inventors: Jianfang Zhu, Portland, OR (US); Ivan Chen, Taipei (TW); Barnes Cooper, Hillsboro, OR (US); Jianwei Dai, Portland, OR (US); Martin Dixon, Portland, OR (US); Kristoffer Fleming, Chandler, AZ (US); Mark Gallina, Hillsboro, OR (US); Duncan Glendinning, Chandler, AZ (US); Deepak Samuel Kirubakaran, Hillsboro, OR (US); Chia-Hung S. Kuo, Folsom, CA (US); Yifan Li, Beaverton, OR (US); Adam Norman, Forest Grove, OR (US); Michael Rosenzweig, Queen Creek, MA (US); Kai P Wang, New Taipei (TW); Jin Yan, Santa Clara, CA (US); Virendra Vikramsinh Adsure, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 751 days.

(21) Appl. No.: 17/558,172

(22) Filed: Dec. 21, 2021

(65) Prior Publication Data
US 2022/0114136 A1 Apr. 14, 2022

(51) Int. Cl.
G06F 1/24 (2006.01)
G06F 9/445 (2018.01)
G06F 15/78 (2006.01)
G06F 9/4401 (2018.01)

(52) U.S. Cl.
CPC ........ G06F 15/7882 (2013.01); G06F 9/4451 (2013.01); G06F 9/4411 (2013.01)

(58) Field of Classification Search
CPC ............... G06F 15/7882; G06F 9/4451; G06F 11/3051; G06F 11/3058; G06F 11/3089; G06F 2201/81; G06F 9/44505; G06F 11/3438; G06F 9/5027; G06F 1/206; G06F 9/4893
USPC ........................................................ 713/100
See application file for complete search history.

(56) References Cited

U.S. PATENT DOCUMENTS

| | | | |
|---|---|---|---|
| 9,652,259 B2* | 5/2017 | Fanning | G06F 11/1441 |
| 11,347,464 B2* | 5/2022 | Rodriguez | G09G 5/00 |
| 11,614,957 B1* | 3/2023 | Mandadi | G06F 9/5016 718/1 |

(Continued)

*Primary Examiner* — Volvick Derose
(74) *Attorney, Agent, or Firm* — Hanley, Flight & Zimmerman, LLC

(57) ABSTRACT

Methods, systems, and apparatus to reconfigure a computer are disclosed. An example electronic device includes at least one memory, instructions in the electronic device, and processor circuitry to execute instructions to analyze data corresponding to a first configuration of the electronic device to detect a change associated with the electronic device, the first configuration corresponding to a respective first user profile, determine a second configuration of the electronic device based on the detected change, and adjust a configuration of the electronic device from the first configuration to the second configuration.

25 Claims, 12 Drawing Sheets

(56) References Cited

U.S. PATENT DOCUMENTS

| | | | | |
|---|---|---|---|---|
| 2004/0145582 | A1* | 7/2004 | Mehta | G09G 5/363 |
| | | | | 345/204 |
| 2013/0046967 | A1* | 2/2013 | Fullerton | G06F 1/32 |
| | | | | 713/100 |
| 2014/0082514 | A1* | 3/2014 | Sivaraman | G06F 3/0416 |
| | | | | 715/745 |
| 2015/0355909 | A1* | 12/2015 | Sallas | G06F 9/4411 |
| | | | | 713/100 |
| 2017/0046503 | A1* | 2/2017 | Cho | G16H 40/63 |
| 2017/0364133 | A1* | 12/2017 | Schluessler | G06F 1/3253 |
| 2018/0018230 | A1* | 1/2018 | Leggette | G06F 11/1076 |
| 2018/0028907 | A1* | 2/2018 | Weng | G06F 3/04842 |
| 2018/0284868 | A1* | 10/2018 | Koker | G06F 1/3218 |
| 2019/0334768 | A1* | 10/2019 | Parthasarathy | H04L 41/08 |
| 2022/0004416 | A1* | 1/2022 | Ilic | G06F 9/45558 |
| 2022/0269542 | A1* | 8/2022 | Christensen | G06F 11/3024 |
| 2022/0400012 | A1* | 12/2022 | Tran | H04L 9/3231 |

* cited by examiner

METHODS, SYSTEMS, AND APPARATUS TO RECONFIGURE A COMPUTER

FIELD OF THE DISCLOSURE

This disclosure relates generally to electronic devices and, more particularly, to method, systems, and apparatus to reconfigure a computer.

BACKGROUND

An electronic device includes a computer system to receive, process, manage, and present information in a meaningful format. During development of the electronic device, numerous assumptions are made to configure the computer system, such as use of the electronic device and applications that run on the computer system. In recent years, however, a number of available applications and potential usages of the electronic device have grown exponentially. Performance of the electronic device may vary depending on a configuration of the computer system, making it increasingly difficult to optimally configure the computer system for a representative population.

Figure 1:
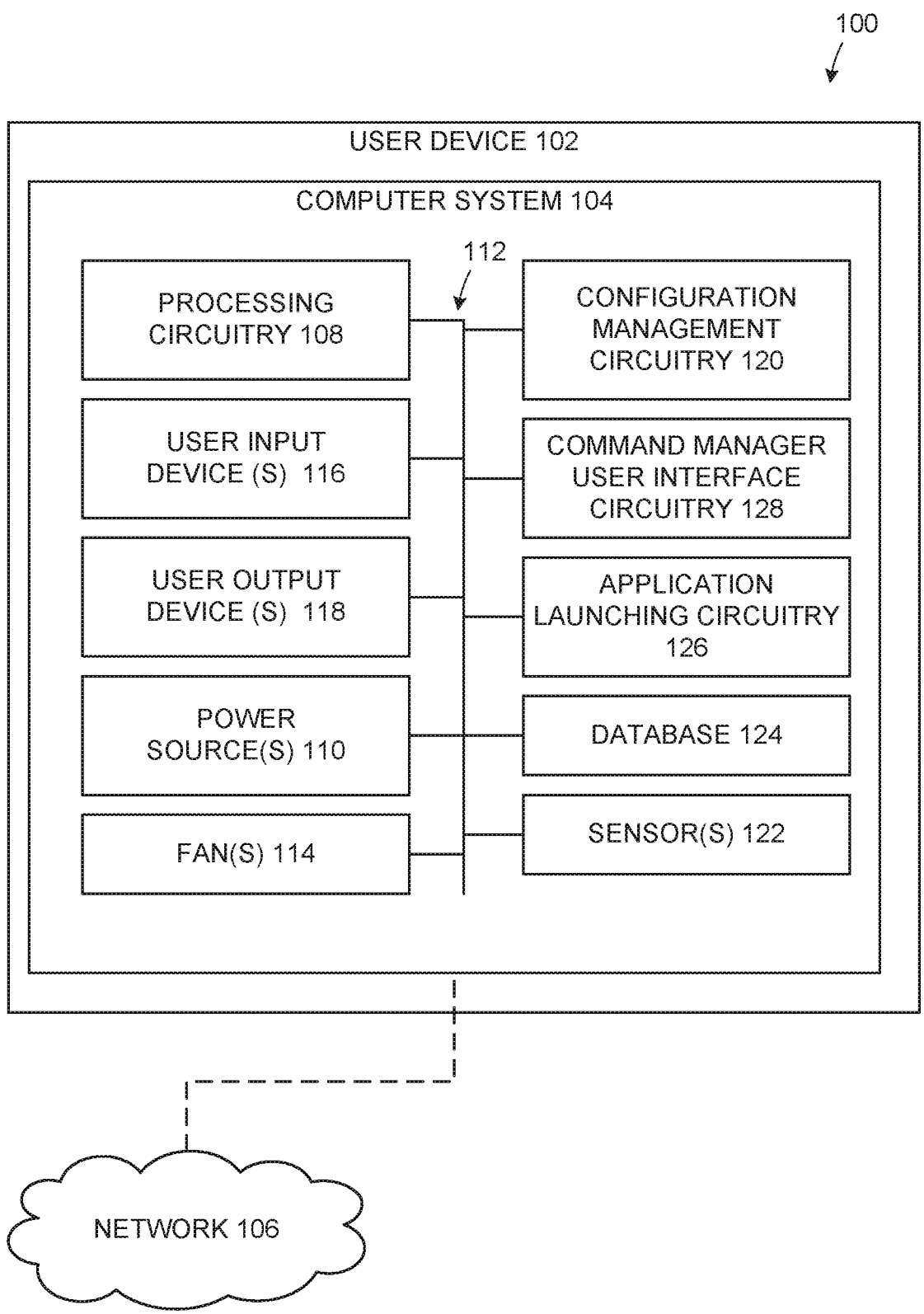
FIG. 1 illustrates an example system including example configuration management circuitry to reconfigure an electronic device in accordance with the teachings of this disclosure.

The figures are not to scale. In general, the same reference numbers will be used throughout the drawing(s) and accompanying written description to refer to the same or like parts. As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other. As used herein, stating that any part is in "contact" with another part is defined to mean that there is no intermediate part between the two parts.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name.

As used herein "substantially real time" refers to occurrence in a near instantaneous manner recognizing there may be real world delays for computing time, transmission, etc. Thus, unless otherwise specified, "substantially real time" refers to real time+/−1 second. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

As used herein, "processor circuitry" is defined to include (i) one or more special purpose electrical circuits structured to perform specific operation(s) and including one or more semiconductor-based logic devices (e.g., electrical hardware implemented by one or more transistors), and/or (ii) one or more general purpose semiconductor-based electrical circuits programmed with instructions to perform specific operations and including one or more semiconductor-based logic devices (e.g., electrical hardware implemented by one or more transistors). Examples of processor circuitry include programmed microprocessors, Field Programmable Gate Arrays (FPGAs) that may instantiate instructions, Central Processor Units (CPUs), Graphics Processor Units (GPUs), Digital Signal Processors (DSPs), XPUs, or microcontrollers and integrated circuits such as Application Specific Integrated Circuits (ASICs). For example, an XPU may be implemented by a heterogeneous computing system including multiple types of processor circuitry (e.g., one or more FPGAs, one or more CPUs, one or more GPUs, one or more DSPs, etc., and/or a combination thereof) and application programming interface(s) (API(s)) that may assign computing task(s) to whichever one(s) of the multiple types of the processing circuitry is/are best suited to execute the computing task(s).

DETAILED DESCRIPTION

An electronic device is a device that includes a computer system (e.g., a collection of hardware and software components). The computer system is designed to receive, process, manage, and present information in a meaningful format. Designing the computer system for the electronic device is a complex task involving a lengthy developmental process, from workload analysis to architecture definition to product validation. During development of the electronic device, a technology company makes numerous decisions concerning design of the computer system, such as types of hardware and software components to include as well as configurations of those components. A configuration as disclosed herein refers to a way a component of the computer system (e.g., a hardware, firmware, software, etc.) is set up for operation. For example, a configuration can be a specific computer policy, a resident algorithm, and/or a system tunable (e.g., processor frequency, central processing unit (CPU) utilization, etc.). A system configuration refers to a configuration of the computer system as whole, including configurations of individual components within the electronic device. Accordingly, to reconfigure a computer system means to reconfigure at least one component and/or setting of the computer system.

Performance of the electronic device is at least partially dependent on how the computer system is configured (e.g., how the computer system uses and allocates its available resources, such as hardware, firmware, and software). However, selecting an optimal system configuration during development of the electronic device is no simple task. First of all, there are numerous configurations to be determined, including computer policies, resident algorithms, and system tunables such as processor frequency, turbo residencies, interrupt rate, etc. Further, an optimal system configuration of the individual computer system must be based on usage of the electronic device (e.g., a specific workload). However, potential uses of the electronic device are countless, with more applications and usages emerging every day. For example, the electronic device may be used for education, gaming, browsing the internet, and/or creating content.

Simulating and/or emulating the nearly innumerable quantity of potential real-life scenarios required to optimize numerous system tunables, computer policies, and resident algorithms is virtually impossible. This is especially true with the tight time-to-market schedule followed by many technology companies today. As a result, technology companies often make undesired assumptions when configuring the computer system of the electronic device. Further, due to high-volume manufacturing variation, technology companies often make worst-case assumptions when selecting configurations of the computer system to ensure quality of the electronic device while limiting individual system capabilities.

Technology companies have utilized a variety of approaches for configuring a computer system during development an electronic device. One example includes performing lab testing of a benchmark (e.g., a representative workload) and selecting system configurations based on the benchmark. However, this is approach is static and results in a one-size-fits-all system configuration. Another example approach utilized by technology companies includes employing a "fast" adaptive algorithm within the computer system to adjust configurations in-field. As disclosed herein, "in-field" refers to use of an electronic device after it is taken out of the box (e.g., after purchase). The "fast" adaptive algorithm dynamically generates a decision at run time based on a short term prediction (e.g. ~1 s or less) about usage of the electronic device by an end user. However, "fast" adaptive algorithms are often noisy and ill-serving, failing to consider long-term usage patterns and changing hardware conditions of the electronic device, such as component degradation.

Because of the numerous factors that play into configuration of the computer system, many electronic devices today include a default system configuration that is tuned for a representative population in a lab. The resultant default system configuration often leads to sub-optimal power, performance, and responsiveness of the electronic device as well as a compromised user experience for an end user. For example, a high-end mobile gaming system with an out-of-the-box (OOB) configuration may be tuned to optimize for maximum performance regardless of how the end user uses the gaming system. Such a default system configuration may fail to deliver a desired user experience for lightly threaded browsing usage by the end user. Accordingly, today's pre-shipment electronic device design and configurations leave open a great deal of potential to improve user experience. A dynamic approach to system configuration of the electronic device could improve device performance and facilitate an enhanced user experience.

Disclosed examples enable a "slow" and "personal" adaption-based configuration solution. "Personal" adaption addresses the fact that people use electronic devices in different manners and care about performance in a different ways. For example, an individual user may care about response time of the electronic device (e.g., a time between a start and completion of a task) while a datacenter employee may care about bandwidth (e.g., a total amount of work done in a given time). "Personal" adaption also considers system-to-system variation in production of electronic devices, addressing the fact that an electronic device operates according to its precise bill of materials. "Slow" adaption takes advantage of users tending to spend a majority of time on similar (e.g., personal) activities, with slower rates of change (e.g., thereby addressing the challenge that "fast" adaptations can be noisy and ill-serving). Further, "slow" adaption considers aging of a hardware component within a computer system and resulting degradation of the hardware component. For example, degradation of a hardware component, such as a central processing unit (CPU), can impact performance of the computer system thereby necessitating reconfiguration to maintain comparable performance.

Examples disclosed herein enable reconfiguration of a computer system in-field to adopt to a current usage and condition of individual computer system. Examples disclosed herein enable the computer system to self-adapt to a specific user usage and/or a changing hardware condition by monitoring user usage telemetry and system hardware conditions and responding accordingly. In some examples, the computer system self-adapts by adjusting a system tunable, a computer policy, and/or a resident algorithm. Certain examples disclosed herein facilitate an improved user experience by enhancing power, performance, and/or responsiveness of the electronic device.

Examples disclosed herein enable manufacture of an intelligent computing system, such as a personal computing system, that learns user usage and self-adapts based on user usage data (e.g., telemetry data). In some examples, a user profile is generated based on the user's signature usage pattern. As disclosed herein, the user profile refers to a type of usage for which the user uses the electronic device such as a content creation usage, productivity usage, agile worker usage, educator usage, etc. The user profile is generated based on long-term usage monitoring and machine learning analysis. In some examples, the user has more than one user profile (e.g., more than usage pattern) for the individual computer system. In such examples, the computer system may detect a user profile switch (usage pattern switch) in real time and adjust the system configuration in real time based on the current usage pattern.

Examples disclosed herein enable generation of a personalized workload based on usage data and/or the user profile.

The personalized workload refers to an amount and type of work performed by an individual computer system in a given period of time. The personalized workload may include the user's frequently used applications, joint probabilities of the frequently used applications, user feedback, etc. In some examples, user feedback is used to gauge the user's satisfaction and/or dissatisfaction with the personalized workload scenario and to adjust the personalized workload accordingly. In some examples, the user has more than one personalized workload, each of which may correspond to a respective user profile. For example, the user may have a work-related workload (e.g., for work-related tasks during day-time hours of a work week) and a recreational workload (e.g., for playing video games on a weekend). The user may use the electronic device to send/receive emails, engage in video calls, and edit documents for the work-related workload, but to play an assortment of video games for the recreational workload. In such examples, the computer system may identify which personalized workload is being used in real time and to adjust configurations based on that workload. In examples disclosed herein, the personalized workload(s) is used to enhance user experience by adjusting the system configuration for optimal performance based on the specific, personalized workload(s). In some examples, the personalized workload(s) is used estimate efficiency and performance of the computer system. In some examples, the personalized workload(s) is associated with and/or stored with a corresponding user profile. In some examples, advanced optimization algorithms (including machine learning techniques) are used to repeatedly infer and/or search for optimal configuration settings for each workload scenario.

Examples disclosed herein enable manufacture of an intelligent computing system that learns an individual computer system's hardware component conditions and self-adapts based on current environmental factors (e.g., telemetry data). As disclosed herein, environmental factors refer to a current state of the system hardware, including a type of hardware in the computer system, a condition of the hardware, degradation of a hardware component, etc. Examples disclosed herein monitor a hardware component and/or an element contained in the electronic device, such as capability of a cooling system, consumption of a component (e.g., persistent storage), component aging, etc. to ascertain the current environmental factors. Certain examples monitor a hardware component condition for changing environmental factors, such as degradation of a power source.

Examples disclosed herein enable ongoing monitoring of usage and hardware conditions of an electronic device as well as dynamic reconfiguration of the electronic device. In examples disclosed herein, reconfiguration is initiated by the computer system based on monitored data, by a user (e.g., via a user interface), and/or by an information technology (IT) management company (e.g., as a remote service). In examples disclosed herein, the computer system may trigger reconfiguration based on a personalized trigger, such as a usage pattern change, a normal context switch, or a change an environmental factor (e.g., component degradation). As disclosed herein, a normal context switch refers to a switch from one known usage (e.g., user profile and/or personalized workload) to another known usage.

In some examples, reconfiguration is triggered by the computer system based on a usage pattern change, such as a change in a usage pattern beyond a threshold. For example, a user may change from a browsing-focused usage pattern to a gaming-focused usage pattern. The gaming-focused usage pattern may require, for example, more power consumption, necessitating reconfiguration for comparable performance.

Another example of a user usage pattern change that may trigger reconfiguration is a user changing from a mobile user to a home user. The mobile user relies on battery power to power the computer system whereas a home user may plug the electronic device into AC and connect the device to an external monitor and/or keyboard. The home user may benefit from a reconfiguration that allows more power consumption by components of the electronic device. Examples disclosed herein enable an electronic device to detect change is usage pattern and associated workload change and to reconfigure according to the new usage pattern and associated workload.

In some examples, reconfiguration is triggered by a change in an environmental factor(s) associated with the electronic device. For example, reconfiguration may be triggered by degradation of a hardware component beyond a threshold. As another example, reconfiguration may be triggered by abnormal computer system behavior, such as a change in system behavior due to malware within the computer system. Examples disclosed herein enable an electronic device to recognize (e.g., detect) an environmental change and to respond accordingly.

In some examples, reconfiguration is triggered by a change in usage context (e.g., normal context switching). For example, a user may use the electronic device for work during the week (e.g., weekday worker context) and for playing video games on the weekend (e.g., weekend gamer). The weekday worker context will likely have a different workload than the weekend gamer context. Examples disclosed herein enable an electronic device to store a configuration for each usage context, to recognize the context switch, and to reconfigure the computer system accordingly.

Examples disclosed herein enable reconfiguration of a computer system in-field based on a current usage of the computer system and current condition of hardware of the computer system. In some examples, reconfiguration is based on a control policy corresponding to a usage type recognized by the computer system, such as a content creation usage or a productivity usage. In some examples, reconfiguration is based on recognition of the user profile, such as the computer system recognizing a previously configured workload scenario and applying corresponding settings. In some examples, reconfiguration is determined using optimization algorithms (e.g., machine learning algorithms and/or techniques). For example, a machine learning algorithm may be used to iteratively search for a new system configuration based on numerous design parameters and permutations.

Examples disclosed herein may improve user experience of an electronic device. For example, a personalized computer system can be created based on a user profile and specific hardware characteristics of the computer system. Certain examples enable a computer system of an electronic device to deliver optimal energy efficiency and responsiveness targeted to the user's profile. Certain examples improve computing of an electronic device by enabling platform monitoring and on-device reconfiguration.

In some examples disclosed herein, machine learning is used to train a model. Artificial intelligence (AI), including machine learning (ML), deep learning (DL), and/or other artificial machine-driven logic, enables machines (e.g., computers, logic circuits, etc.) to use a model to process input data to generate an output based on patterns and/or associations previously learned by the model via a training process. For instance, the model may be trained with data to recognize patterns and/or associations and follow such patterns and/or associations when processing input data such that other input(s) result in output(s) consistent with the recognized patterns and/or associations.

Many different types of machine learning models and/or machine learning architectures exist. In some examples disclosed herein, a neural network model is used. However, other types of machine learning models could additionally or alternatively be used such as a convolution neural network (CNN), a regression neural network (RNN), etc.

In general, implementing a ML/AI system involves two phases, a learning/training phase and an inference phase. In the learning/training phase, a training algorithm is used to train a model to operate in accordance with patterns and/or associations based on, for example, training data. In general, the model includes internal parameters that guide how input data is transformed into output data, such as through a series of nodes and connections within the model to transform input data into output data. Additionally, hyperparameters are used as part of the training process to control how the learning is performed (e.g., a learning rate, a number of layers to be used in the machine learning model, etc.). Hyperparameters are defined to be training parameters that are determined prior to initiating the training process.

Different types of training may be performed based on the type of ML/AI model and/or the expected output. For example, unsupervised training (e.g., used in deep learning, a subset of machine learning, etc.) involves inferring patterns from inputs to select parameters for the ML/AI model (e.g., without the benefit of expected (e.g., labeled) outputs).

In examples disclosed herein, ML/AI models are trained using a Bayesian algorithm. However, any other training algorithm may additionally or alternatively be used. Training is performed using training data. In examples disclosed herein, the training data originates from locally generated data. Once training is complete, the model is deployed for use as an executable construct that processes an input and provides an output based on the network of nodes and connections defined in the model.

Once trained, the deployed model may be operated in an inference phase to process data. In the inference phase, data to be analyzed (e.g., live data) is input to the model, and the model executes to create an output. This inference phase can be thought of as the AI "thinking" to generate the output based on what it learned from the training (e.g., by executing the model to apply the learned patterns and/or associations to the live data). In some examples, input data undergoes pre-processing before being used as an input to the machine learning model. Moreover, in some examples, the output data may undergo post-processing after it is generated by the AI model to transform the output into a useful result (e.g., a display of data, an instruction to be executed by a machine, etc.).

In some examples, output of the deployed model may be captured and provided as feedback. By analyzing the feedback, an accuracy of the deployed model can be determined. If the feedback indicates that the accuracy of the deployed model is less than a threshold or other criterion, training of an updated model can be triggered using the feedback and an updated training data set, hyperparameters, etc., to generate an updated, deployed model.

FIG. 1 illustrates an example system 100 to reconfigure a computer system structured in accordance with the teachings of this disclosure. The example system 100 includes an example electronic device (e.g., electronic user device, user device, device, etc.) 102. The example electronic device 102 may be any suitable electronic device, such as a personal computer (PC) device (e.g., desktop, laptop, an electronic tablet, etc.), a gaming system, a smartphone, etc. The electronic device 102 includes an example computer system 104, which includes hardware and software components that allow the electronic device 102 to receive, process, store, and output information. The example electronic device 102 requires the example computer system 104 to function. Components of the computer system 104 and/or configurations of the computer system 104 are inherently components and/or configurations of the electronic device 102.

In some examples, the example electronic device 102 is communicatively coupled to an example network 106. In the illustrated example, the network 106 is the Internet. However, the example network 106 may be implemented using any other network over which data can be transferred. The example network 106 may be implemented using any suitable wired and/or wireless network(s) including, for example, one or more data buses, one or more Local Area Networks (LANs), one or more wireless LANs, one or more cellular networks, one or more private networks, one or more public networks, among others. In additional or alternative examples, the network 106 is an enterprise network (e.g., within businesses, corporations, etc.), a home network, among others The example electronic device 102 of FIG. 1 includes example processing circuitry 108, an example power source(s) 110, an example bus 112, an example fan(s) 114, an example user input device(s) 116, an example user output device(s) 118, example configuration management circuitry 120, an example sensor(s) 122, an example database 124, example application launching circuitry 126, and example command manager user interface circuitry 128. In some examples, one or more of the example components of the electronic device 102 may be incorporated in, or otherwise form a portion of, another component.

The example processing circuitry 108 executes machine readable instructions (e.g., software) including, for example, user applications. The processing circuitry 108 of the example electronic device 102 is a semiconductor-based hardware logic device. The processing circuitry 108 may implement a central processing unit (CPU) of the electronic device 102, may include any number of cores, and may be implemented, for example, by processing circuitry commercially available from Intel® Corporation. In some examples, the processing circuitry 108 is communicatively coupled to additional processor circuitry.

The computer system 104 of the example electronic device 102 includes at least one power source(s) 110 to provide power to the processing circuitry 108 and/or other components of the electronic device 102 communicatively coupled via an example bus 112. The one more power source(s) 110 may include a battery, transformer, AC/DC power converter, etc.

In the example of FIG. 1, the hardware components of the computer system 104 (e.g., the processing circuitry 108, etc.) generate heat during operation of the electronic device 102. Accordingly, the computer system 104 of FIG. 1 includes at least one example fan(s) 114. In additional or alternative examples, the computer system 104 is passively cooled. Accordingly some example computer systems 104 may not include an example fan 114. The example fan(s) 114 of FIG. 1 promotes airflow to cool the electronic device 102 during use and prevent overheating of the hardware components. The example fan(s) 114 exhausts hot air generated within the body of the electronic device 102 to cool the device 102. The example fan(s) 114 is used to meet maintain hardware component temperatures within an industry threshold.

The computer system 104 includes an example user input device(s) 116 and an example user output device(s) 118. The user input device(s) 116 and/or user output device(s) 118 allow a user to interact with the computer system 104 of the electronic device 102. For example, a user may use the user input device 116 to provide user feedback to the computer system 104 regarding, for example, performance of the electronic device 102. The user may provide user feedback to the computer system 104 in response to receiving an inquiry for user feedback via an example user output device 118. The example input device 116 may include a mouse, a keyboard, a touchpad, a touch screen etc. The example output device 118 may include a speaker, a monitor, a computer screen, etc. In some examples, the user input device 116 and/or the user output device 118 is an external device communicatively coupled to the computer system 104, such as an external keyboard, external headphones, etc. For example, the user input device 116 and/or the user output device 118 may be communicatively coupled to the computer system 104 via one or more wired or wireless connections. In some examples, the computer system 104 includes more than one input device 116 and/or more than one output device 118. In some examples, the input device 116 and the output device 118 may be the same device. For example, a tablet may have a touch screen that displays data and allows a user to input data.

The computer system 104 of FIG. 1 includes example configuration management circuitry 120 structured to self-adapt to individual user usages and environmental factors (e.g., system hardware conditions, component degradation, etc.) of the computer system 104 in accordance with the teachings of this disclosure. The configuration management circuitry 120 monitors usage of the electronic device 102 by an end user as well as conditions of hardware components of the electronic device 102 and generates data (e.g., telemetry data, etc.).

To aid in monitoring, the computer system 104 of FIG. 1 includes at least one example sensor 122 that provides means for detecting and/or monitoring hardware contained in the electronic device 102 and/or usage of the electronic device 102. The configuration management circuitry 120 uses data collected from the example sensor(s) 122 to analyze a condition of the hardware within the electronic device 102 and/or to determine a type of usage of the individual computer system 104 by an end user. The computer system 104 can include any types of sensor(s) 122 suitable to monitor user usage and/or environmental factors (e.g., a condition of a hardware component, etc.) of the electronic device 102, such as a temperature sensor, audio sensor, device sensor, etc.

In some examples, the computer system 104 includes a sensor 122 that measures a temperature associated with a hardware component(s) of the computer system 104, such as the processing circuitry 108 (e.g., a CPU, a graphics processing unit (GPU), etc.). In some examples, the computer system 104 includes an additional or alternative sensor 122 to measure a temperature of a skin of a housing of the electronic device 102 and/or an exterior surface of the electronic device 102 that can be touched by a user (e.g., a base of a laptop). In some examples, the computer system 104 includes an audio sensor 122 (e.g., a microphone) to measure a noise level corresponding to the example fan(s) 114. For example, a fan 114 that operates at a level of noise above a pre-determined threshold may indicate that the processing circuitry 108 is working harder than usual, suggesting that the processing circuitry 106 has degraded.

The example configuration management circuitry 120 serves to monitor a user's usage of the electronic device 102 to generate a user profile based on usage of the individual computer system 104. The user profile indicates the type of usage for which the user uses the electronic device 102, such as a content creation usage type, education usage type, etc. The configuration management circuitry 120 also generates a personalized workload. The personalized workload may be used to determine an advantageous system configuration of the computer system 104 by basing the system configuration on the personalized workload. In some examples, the personalized workload is associated with corresponding user profile. The example configuration management circuitry 120 also serves to monitor a condition of a hardware component(s) within the electronic device 102. For example, the configuration management circuitry 120 may monitor a capability of a cooling system of the electronic device 102 (e.g., an ability of the fan(s) 114 to cool a hardware component while maintaining a noise level below a threshold, etc.), hardware component utilization(s) (e.g., CPU utilization, etc.), hardware component aging, etc. The configuration management circuitry 120 generates data based on the monitoring.

The example configuration management circuitry 120 is structured to process (e.g., store and analyze) the monitored telemetry data (e.g., user usage data and/or hardware condition data) and to reconfigure the computer system 104 in response to a change in usage and/or a change in a hardware component. For example, the configuration management circuitry 120 may trigger reconfiguration in response to a change in a usage pattern beyond a threshold, a hardware component degrading beyond a threshold, a context switch (e.g., weekend versus weekday usage) of the electronic device, etc.

In response to a reconfiguration trigger, the configuration management circuitry 120 is structured to self-adapt to a current user usage and/or current condition of a hardware component. The configuration management circuitry 120 responds to a reconfiguration trigger by configuring the computer of the electronic device 102 according to a current user profile/personalized workload. For example, the configuration management circuitry 120 may defer to a relevant control policy (e.g., based on usage type), infer an optimal configuration by recognizing a user profile, and/or apply an algorithm (e.g., machine learning algorithm) to determine a new configuration. For example, the configuration management circuitry 120 may recognize a user profile for which the computer system 104 was previously reconfigured and to reconfigure based on the user profile. In some examples, the configuration management circuitry 120 adjusts a plurality of settings, including system tunables, control policies, resident algorithms, silicon configuration(s), platform firmware configuration(s), device configuration(s), etc. during reconfiguration.

In some examples, the configuration management circuitry 120 is implemented via executable instructions executed by on one or more processors of the computer system 104. For example, the configuration management circuitry 120 may be implemented by processing circuitry 108 and/or other processors and/or hardware components of the electronic device 102. In some examples, the configuration management circuitry 120 is implemented by the processing circuitry 108 (e.g., a system of on chip (SOC)). In some examples, the configuration management circuitry 120 is instantiated by processor circuitry such as a central processing unit executing instructions. In some examples, the configuration management circuitry 120 may be instantiated by an application specific integrated circuit (ASIC) or a field programmable gate array (FPGA) structured to perform operations corresponding to the instructions. In some examples, the configuration management circuitry 120 is implemented by one or more cloud-based devices, such as such as one or more servers, processors, and/or virtual machines and/or containers located remotely from the electronic device 102. In other examples, some of the tasks performed by the configuration management circuitry 120 is implemented by cloud-based devices and other parts of the analysis are implemented by local processor(s) or one or more computing device(s).

The example computer system 104 of FIG. 1 includes an example database 124 structured to store information and/or data associated with the reconfiguration system 100. For example, the database 124 can store a user profile (including a personalized workload, etc.), a bill of materials, a control policy, threshold values, etc. The example database 124 is implemented by any memory, storage device and/or storage disc for storing data such as, for example, flash memory, magnetic media, optical media, solid state memory, hard drive(s), thumb drive(s), etc. Furthermore, the data stored in the database 124 may be in any data format such as, for example, binary data, comma delimited data, tab delimited data, structured query language (SQL) structures, an executable (e.g., an executable binary, a configuration image, etc.), etc. While, in the illustrated example, the example database 124 is illustrated as a single device, the example database 124 and/or any other data storage devices described herein may be implemented by any number and/or type(s) of memories. The example database 124 is located within the computer system 104 in the illustrated examples. In additional or alternative examples, the example database 124 is located external to the computer system 104 and/or the electronic device 102, in a location accessible by the computer system 104.

The example computer system 104 of FIG. 1 includes example application launching circuitry 126. The application launching circuitry 126 is structured to launch an application of the computer system 104 in response to receiving a request to launch the application. In some examples, the configuration management circuitry 120 may determine that a user typically launches (e.g., over a threshold amount) a specific application (e.g., an email application, an internet browser, etc.) by 10:00 am during workweek days (e.g., Monday through Friday). In such examples, the configuration management circuitry 120 may instruct and/or request the application launching circuitry 126 to launch the specific application by 10:00 am weekday mornings so that the application is ready for use by the end user.

The computer system 104 of FIG. 1 includes example command manager user interface circuitry 128 structured to provide information to and/or receive information from the end user. For example, the command manager user interface circuitry 128 may be used to provide a recommendation to the end user of the computer system 104 to release background applications (e.g., to provide more CPU utilization for critical applications such as an anti-viral application and for foreground applications being used by the end user). In response, the end user may utilize the command manage user interface circuitry 128 to allow the computer system 104 to release the background applications.

Figure 2:
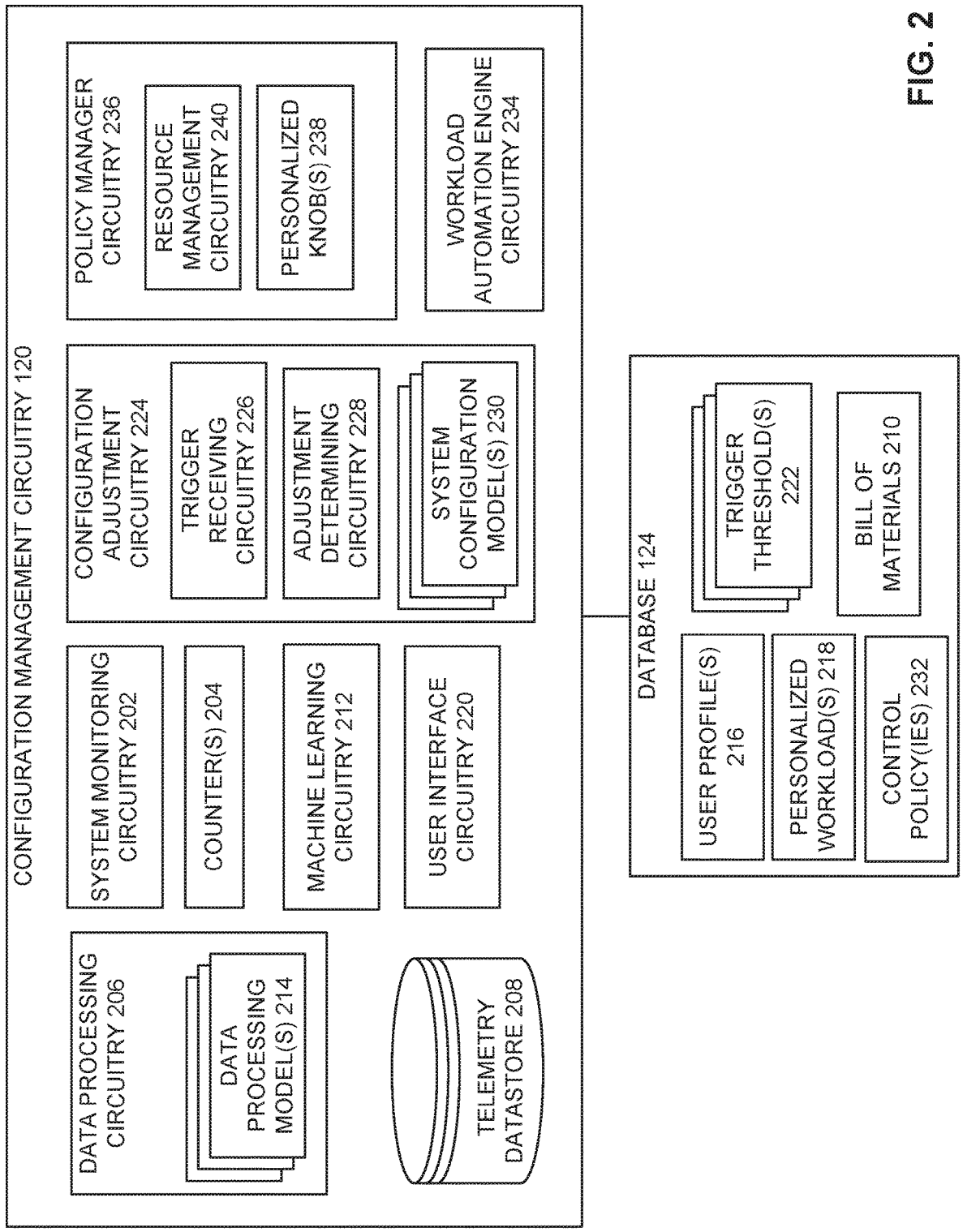
FIG. 2 is a block diagram of the example configuration management circuitry of FIG. 1.

FIG. 2 is a block diagram of an example implementation of the example configuration management circuitry 120 of FIG. 1. The configuration management circuitry 120 is structured to reconfigure a computer system (e.g., computer system 104) of an electronic device (e.g., electronic device 102) to adapt to a personal usage and environmental factors of the individual system by monitoring a user's usage of the electronic device 102 and system hardware components of the computer system 104. The configuration management circuitry 120 of FIG. 2 may be instantiated (e.g., creating an instance of, bring into being for any length of time, materialize, implement, etc.) by processor circuitry such as a central processing unit executing instructions. Additionally or alternatively, the configuration management circuitry 120 of FIG. 2 may be instantiated (e.g., creating an instance of, bring into being for any length of time, materialize, implement, etc.) by an ASIC or an FPGA structured to perform operations corresponding to the instructions. It should be understood that some or all of the circuitry of FIG. 2 may, thus, be instantiated at the same or different times. Some or all of the circuitry may be instantiated, for example, in one or more threads executing concurrently on hardware and/or in series on hardware. Moreover, in some examples, some or all of the circuitry of FIG. 2 may be implemented by one or more virtual machines and/or containers executing on the microprocessor.

The configuration management circuitry 120 is communicatively coupled to an example database (e.g., example database 124). In some examples, the database 124 is included in the configuration management circuitry 120. In additional or alternative examples, the database 124 is located external to the electronic device 102 in a location accessible to the configuration management circuitry 120.

The configuration management circuitry 120 of FIG. 2 includes example system monitoring circuitry 202, at least one example counter(s) 204, and example data processing circuitry 206. The system monitoring circuitry 202 is structured to monitor usage of the electronic device 102 and conditions of hardware in the electronic device 102 to generate data (e.g., telemetry data). In the illustrated example, the system monitoring circuitry 202 is structured to transfer monitored data to the data processing circuitry 206 for storage and analysis. In additional or alternative examples, the system monitoring circuitry 202 may be structured to store generated data in the example telemetry datastore 208, which is to be retrieved and analyzed by the data processing circuitry 206. In some examples, the system monitoring circuitry 202 may be executed by one or more circuitry components.

The example system monitoring circuitry 202 monitors the electronic device 102 for usage-related data such as application usage, memory consumption, disk space usage, and background activity of the computer system 104 as well as conditions of hardware components. The system monitoring circuitry 202 uses a variety of resources to monitor usage, such as a counter(s) (e.g., a performance counter, a hardware counter, etc.), a sensor(s) (e.g., sensor(s) 122), user feedback, etc.

The configuration management circuitry 120 includes at least one example counter(s) 204, which is structured to monitor a feature of the computer system 104. The counter determines a number of times a particular event or process occurs. A performance counter(s), for example, collects various types of system data such as CPU, memory, and disk usage statistics. A hardware counter(s), for example, records a variety of measurements, including a number of instructions executed, an average clock cycle per instruction (CPI), etc.

In the illustrated example, the system monitoring circuitry 202 utilizes the one or more counter(s) (e.g., performance counter, hardware counter, etc.) of the computer system 104 to monitor processing circuitry, memory, hardware, etc. to generate user usage data and hardware component data. In some examples, the system monitoring circuitry 202 is construed to monitor processing circuitry of the computer system 104, such as a CPU (including cores of the CPU) and/or a graphics processing unit (GPU). For example, the system monitoring circuitry 202 monitors the CPU to generate CPU usage data, such as CPU utilization, processor frequency, CPU energy consumption, CPU utilization from foreground applications, a number of cores, etc. In some examples, the system monitoring circuitry 202 monitors a turbo residency of a CPU core (e.g., how often and how long a core engages in turbo mode). In additional or alternative examples, the system monitoring circuitry 202 monitors the GPU to generate GPU usage data, such as GPU utilization (e.g., from foreground applications, background application, etc.), and GPU energy consumption. In some examples, the system monitoring circuitry 202 is construed to monitor foreground and/or background application information, such as application usage, launch time statistics, etc. In some examples, the system monitoring circuitry 202 monitors storage-related information. For example, the system monitoring circuitry 202 may monitor disk utilization, memory utilization, etc. The system monitoring circuitry 202 may monitor any other type of user usage related aspect of the electronic device 102, such as core concurrency statistics (e.g., CPU core, GPU core, etc.), devices connected to the electronic device 102, throttling statistics, etc.

In additional or alternative examples, the system monitoring circuitry 202 utilizes a sensor(s) (e.g., sensor(s) 122) to monitor user usage. For example, the system monitoring circuitry 202 of FIG. 2 is structured to receive data from the at least one sensor 122 of the electronic device 102. In some examples, the system monitoring circuitry 202 monitors a temperature-type sensor 122 to generate temperature related telemetry data, such as a skin temperature of the electronic device 102, a CPU temperature, a graphics processing unit (GPU) temperature, etc. In some examples, the system monitoring circuitry 202 monitors an acoustic-type sensor 122, such as a microphone, to generate audio related user usage telemetry data. For example, the system monitoring circuitry 202 may use an audio sensor 122 to determine an audio level of a fan (e.g., fan 114) (e.g., rotations per minute).

The example system monitoring circuitry 202 is further structured to monitor a hardware component of the computer system 104. For example, the system monitoring circuitry 202 monitors for hardware component conditions, such as system cooling capability, component consumption (e.g., persistent storage), component aging, etc. In some examples, the system monitoring circuitry 202 monitors the electronic device 102 for hardware component variation (e.g., individual system components, etc.). For example, the system monitoring circuitry 202 may determine particulars about hardware components contained in the electronic device 102 (e.g., types of hardware, their specifications, etc.). In the illustrated example, the system monitoring circuitry 202 stores an example bill of materials 210 in the database 124. In additional or alternative examples, the bill of materials 210 is stored elsewhere in a location that is accessible by the configuration management circuitry 120. The example bill of materials 210 includes a listing of specific hardware components of the electronic device 102 and the particular specifications of the hardware components. For example, the bill of material 210 may contain information about a specific CPU in the user devices, as well as the CPUs core count, amount of L caches, multithreading capabilities of the CPU, etc. In some examples, the system monitoring circuitry 202 monitors aging of hardware components in the electronic device 102. For example, the system monitoring circuitry 202 may monitor hardware component aging for resulting degradation of an aging hardware component. The system monitoring circuitry 202 may monitor various hardware component factors, such as a silicon voltage-frequency (V-F) curve change over time, battery impedance and/or capacity, power delivery network and/or decoupling, thermal solution, etc.

As noted above, the example data processing circuitry 206 of FIG. 2 is structured to store and to analyze data received from the system monitoring circuitry 202. In the illustrated example, the data processing circuitry 206 receives data from the system monitoring circuitry 202 and stores the data in the telemetry datastore 208. To maintain a user's privacy and data security, the telemetry datastore 208 of FIG. 2 is located within the electronic device 102. In additional or alternative examples, the telemetry datastore 208 is stored in a location external to the electronic device 102 (e.g., a cloud, etc.) that is accessible by the electronic device 102. Such examples may necessitate additional security protections corresponding to a user's privacy and data security.

Over an operational period of the electronic device 102, the data processing circuitry 206 stores a variety of data in the telemetry datastore 208. Accordingly, the configuration management circuitry 120 of FIG. 2 includes example machine learning circuitry 212 structured to train a model (e.g., using telemetry data, use profile(s), personalized workload(s), etc.). For example, the configuration management circuitry 120 may employ the example machine learning circuitry 212 to generate a data processing model(s) 214 for use by the data processing circuitry 206. The data processing circuitry 206 is structured to store data and accomplish a variety of analysis tasks, such as generating a user profile(s) and/or a personalized workload(s), recognizing a usage change, recognizing hardware degradation, triggering reconfiguration, etc. Accordingly, more than one data processing models 214 is trained in some examples, each data processing model 214 trained for a respective task(s). In some examples, a data processing model 214 may be trained after a reconfiguration of the computer system 104 to be associated with the new configuration.

In some examples, a data processing model(s) 214 is trained to store data received from the system monitoring circuitry 202 in the telemetry datastore 208. In such examples, the example data processing model(s) 214 may enable efficient data storage and processing by the data processing circuitry 206. In some examples, a data processing model(s) 214 is trained to recognize a change in usage of the electronic device 102. In such example, the data processing model(s) 214 may be trained using telemetry data as well as a user profile to generate threshold values (e.g., a threshold of change) and/or to recognize a change in contextual usage of the electronic device 102 (e.g., from a known work usage to a known gaming usage). In some examples, a data processing model(s) 214 is trained to recognize a change in environmental factors, such as a hardware component change, etc. In such examples, the data processing model(s) 214 may be trained using telemetry data and the bill of materials 210 to generate threshold values (e.g., a threshold of change). The data processing circuitry 206 may utilize the data processing model(s) 214 to analyze monitored data received from the system monitoring circuitry 202 (e.g., telemetry data). For example, the data processing circuitry 206 may use the data processing model(s) 214 during analysis of telemetry data to recognize a usage pattern change (e.g., beyond a threshold), a hardware component change (e.g., beyond a threshold), and/or a context usage switch. In some examples, the data processing model(s) 214 may be re-trained after a reconfiguration of the computer system 104.

In the illustrated example of FIG. 2, the data processing circuitry 206 is structured to generate an example user profile(s) 216 based on the monitored user usage data. The user profile(s) includes information about a specific usage pattern, such as a type of usage, application usage, etc. As noted above, more than one user profile(s) is generated in some examples. For example the user may use the device 102 for work, content creation, education, gaming, and/or browsing. Accordingly, a corresponding user profile 216 may be generated for each respective context (e.g., usage pattern). In the illustrated example, the user profile(s) 216 is stored in the database 124. However, the user profile(s) 216 may be stored in any suitable location that is accessible by the configuration management circuitry 120.

The data processing circuitry 206 is further structured to generate an example personalized workload(s) 218 based on user usage data and/or user feedback. The configuration management circuitry 120 includes an example user interface circuitry 220 structured to provide information to the user and to receive information from the user. The example user interface circuitry 220 enables the user to provide feedback corresponding to a workload scenario, such a satisfaction with the workload scenario and/or dissatisfaction with the workload scenario. In some examples, the personalized workload 218 is associated with a corresponding user profile 216. The personalized workload(s) 218 of FIG. 2 includes the user's frequently used applications for the specific context, their joint probabilities (e.g., a probability of a first application and a second application being launched at the same time), time-related information for the context (e.g., morning work-related context versus evening recreational context), user satisfaction and/or dissatisfaction with the workload scenario, etc.

In some examples, discussed further below, the personalized workload 218 is used when determining a configuration of the computer system 104. For example, the personalized workload 218 may be used to determine an optimal configuration of the computer system 104 corresponding to the personalized workload 218 for a specific user profile 216. For example, configurations may be iteratively determined by testing a configuration against the personalized workload via a workload automation engine to generate power and/or performance results and to adjust the configuration accordingly.

As noted above, the data processing circuitry 206 is further structured to analyze monitored telemetry data to identify a condition of a hardware component(s) of the electronic device 102, such as a power source condition (e.g., power source 110), a CPU condition, etc. and to detect a change in the hardware component's condition (e.g., degradation of the component). For example, the data processing circuitry 206 may detect degradation of a battery in the electronic device 102 based on a change in a battery life of the battery (e.g., a decreased battery life). In some examples, the data processing circuitry 206 may detect degradation of the CPU thermal solution by measuring a high CPU operating temperature regardless of CPU power.

Performance of the electronic device 102 is largely dependent on the configuration of the individual computer system 104. Because performance of the electronic device 102 often affects a user experience, reconfiguring the computer system 104 based on usage of the electronic device 102 may improve performance of the electronic device 102 and subsequently boost user experience. Accordingly, the data processing circuitry 206 is structured to analyze telemetry data to detect a change in usage of the electronic device 102 and/or a change environmental factors of the electronic device 102 (e.g., change in a hardware condition) and to respond accordingly. In the illustrated example, the data processing circuitry 206 is structured to trigger reconfiguration of the computer system 104 in response to detecting change in usage beyond a threshold (e.g., usage pattern change, normal context switch, etc.) and/or a change in a hardware component condition beyond a threshold. Accordingly, the database 124 includes an example trigger threshold(s) 222. The trigger threshold(s) 222 includes threshold values of change, which may be based on the bill of materials 210, the telemetry data, etc. The trigger thresholds 222 are dynamic in some examples, and may change after a reconfiguration of the computer system 104. In the illustrated example, the trigger threshold(s) 222 is stored in the database 124. However, the trigger threshold(s) may be stored in any suitable location that is accessible by the configuration management circuitry 120.

In some examples, the data processing circuitry 206 triggers reconfiguration in response to detecting a change in usage pattern and/or sentiment (e.g., changing a user profile/ usage type). For example, the computer system 104 may be configured for a user profile 216 that corresponds to a content creation type usage. However, the user may change a usage type from the content create type usage user profile 216 to an agile worker type usage. The data processing circuitry 206 is structured to detect such a change and to trigger reconfiguration as a response.

In some examples, the data processing circuitry 206 triggers reconfiguration in response to a context switch. An end user may use the electronic device 102 for multiple tasks/usage types, such as an agile work usage and a gaming usage. Accordingly, the data processing circuitry 206 would generate an agile worker user profile 216 and a gaming user profile 216. The data processing circuitry 206 is structured to recognize a switch between the two user profiles (e.g., usage types) and to trigger reconfiguration accordingly.

In some examples, the data processing circuitry 206 triggers reconfiguration in response to an environmental change (e.g., degradation of a system component, abnormal behavior of a system component, etc.). For example, the data processing circuitry 206 may detect degradation of a hardware component, such as degradation of a battery contained in the electronic device 102 and used to power the computer system 104. For example, the battery may have had a battery life of 14 hours. However, after degradation and/or aging of the battery, the battery now has a battery life of only 10 hours. The data processing circuitry 206 is structured to trigger reconfiguration upon the degradation of the battery reaching a threshold value of change (e.g., loss of 4 hours of battery life). As another example of an environmental change, a user may add random access memory (RAM) to the electronic device 102 by replacing the RAM of the computer system 104 and/or adding additional RAM. In such an example, the data processing circuitry 206 may trigger reconfiguration if the additional RAM goes beyond a threshold value.

As discussed above, the data processing circuitry 206 is structured to trigger reconfiguration in response to detecting a change beyond a threshold in usage of the electronic device 102 and/or change in environment factors of the computer system 104. In examples disclosed herein, a reconfiguration trigger includes an indication of the change that triggered reconfiguration (e.g., usage pattern change, normal context switch, hardware component change, etc.) and the data associated with a new (e.g., current) user profile 216 and/or personalized workload 218 for which reconfiguration is triggered. Accordingly, some examples allow for an optimal reconfiguration of the computer system 104, which is based on the current user profile 216 and/or current personalized workload 218.

The example configuration management circuitry 120 of FIG. 2 includes example configuration adjustment circuitry 224 structured to reconfigure the computer system 104 in response to receiving a trigger for reconfiguration. The configuration adjustment circuitry 224 includes example trigger receiving circuitry 226, example adjustment determining circuitry 228, and example system configuration model(s) 230. Throughout a lifecycle of the computer system 104 of the electronic device 102, reconfiguration can be triggered from time to time via the data processing circuitry 206 and/or through a request for reconfiguration (e.g., from a user, from an IT service manager, etc.). Accordingly, the example trigger receiving circuitry 226 is structured to receive a trigger for reconfiguration (e.g., via the data processing circuitry 206 and/or via the request for reconfiguration) and to instantiate the example adjustment determining circuitry 228 to determine a new configuration. The example adjustment determining circuitry 228 is structured to determine a configuration for the computer system 104 to be applied by the configuration adjustment circuitry 224. Based on the trigger and/or monitored data, the adjustment determining circuitry 228 determines the reconfiguration settings of the computer system 104 based on an example control policy 232, based on a recognized user profile 216, based on machine learning algorithms (e.g., using a current user profile 216 and/or a current personalized workload 218), etc.

A user who falls under a usage type, such as an education usage type, is likely to consistently use a certain class of applications. In some examples, the adjustment determining circuitry 228 may determine that the user profile 216 for which reconfiguration was triggered indicates that the user uses a class of applications that correspond to a known usage type and respective control policy 232. In such examples, the adjustment determining circuitry 228 may defer to the control policy 232 to determine a new configuration. The example control policy(ies) 232 corresponds to a respective usage type (e.g., productivity usage, content creation usage, education usage, agile work usage, etc.) and may be used to determine advantageous configurations for the specific usage type. The control policy 232 includes rules and/or guidelines for configuring the computer system 104 based the respective usage type and the class of applications commonly used by users of the usage type (e.g., workload). For example, the control policy 232 may include internal hardware-controlled performance states (HWP) autonomous P-code parameters corresponding to the respective usage type, frequently used applications of the usage type, turbo residencies, etc. Based on the amount of background activity on the computer system 104, two users using identical applications may require different frequency response from HWP autonomous to be able to meet same level of responsiveness and battery life expectation. Accordingly, the adjustment determining circuitry 228 may utilize the personalized workload 218 and the control policy 232 to generate a customized look up table for target utilization and frequency ramp time of a processor at given time of day or day of week. Additionally or alternatively, the adjustment determining circuitry 228 may tune power management control setting values (e.g., PL1/PL2/PL4 tau values, etc.) based on turbo residencies and the type of user profile. For example, a content creation type usage may have a higher turbo residency and use multi-core turbo whereas a productivity type usage may have a lower turbo residency and use single core turbo. Knowing the importance of applications installed by user that are running on the system (e.g., based on their frequency of use by user and their CPU frequency requirements) may enable the adjustment determining circuitry 228 to determine whether to be prioritize an application on a performant big core or more efficient little cores when both are available for scheduling. Further, the control policy 232 enables the adjustment determining circuitry 228 to characterize big core versus small core usage of the application based on the user profile when applying personalized reconfiguration using internal parameters in HWP autonomous algorithms.

In the illustrated example, the example control policy(ies) 232 is stored in the database 124. In additional or alternative examples, the control policy(ies) 232 may be stored elsewhere in location that is accessible by the configuration management circuitry 120, such as a cloud server.

In some examples, the adjustment determining circuitry 228 may recognize the user profile 216 for which reconfiguration was triggered, indicating the detected change is a normal context switch. In such examples, the adjustment determining circuitry 228 determines the configuration of the computer system 104 based on the recognized user profile 216. For example, the adjustment determining circuitry 228 may cause the configuration adjustment circuitry 224 to apply the previously determined configuration corresponding to the recognized user profile 216. Accordingly, the configuration adjustment circuitry 224 includes an example system configuration model(s) 230 (e.g., configuration model(s) 230). The system configuration model(s) 230 is a model that was previously trained to configure settings of the computer system 104 based on the user profile 216 and corresponding personalized workload 218. In some example, a user profile 216 is associated with a corresponding system configuration model 230, enabling the adjustment determining circuitry 228 to determine the new configuration based on the respective configuration model 230 in response to detecting a normal context switch.

In some examples, the adjustment determining circuitry 228 may determine that the current usage is similar to a known user profile 216, with recognized differences. In such examples, the adjustment determining circuitry 228 may utilize the machine learning circuitry 212 to analyze a clustering distance using a similarity metric to choose a "closest" previous configuration. In such examples, the adjustment determining circuitry 228 may select a configuration based on a configuration of the "closest" user profile. The adjustment determining circuitry 228, however, may recommend an additional adjustment phase based on continued monitoring of the electronic device 102.

In some examples, the adjustment determining circuitry 228 determines that the user profile 216 for which reconfiguration was triggered does not relate to a control policy 232 and/or is not a normal context switch. For example, the configuration adjustment circuitry 224 may not recognize the user profile 216 and/or may recognize a similar user profile 216 but a change still exists beyond a threshold. In such examples, the adjustment determining circuitry 228 applies machine learning to determine a new configuration. The adjustment determining circuitry 228 utilizes the machine learning circuitry 212 to determine the reconfiguration settings based on the user profile 216 and corresponding personalized workload 218. In such examples, the adjustment determining circuitry 228 utilizes the machine learning circuitry 212 to iteratively search a large solution space for a system configuration based on a plurality design parameters and/or permutations. For example, core parking policy on a Windows™ system includes more than 10 parameters resulting in a large solution space having thousands of permutations. The core parking policy may be especially aggressive if the computer system 104 does not run many background activities. Such an aggressive core parking policy allows more cores to park as well as wake slowly and is often the default configuration in an OOB system condition. However, a computer system 104 with numerous applications often has heavy background noise, resulting in system power and performance degradation with such an aggressive core parking policy. Reconfiguring the computer system 104 based on the personalized workload 218 may improve power and performance by considering heavy background noise while tuning the core parking policy to be less aggressive, allowing more cores to process background workload and lowering a latency of wakeup.

The configuration management circuitry 120 includes example workload automation engine circuitry 234 structured to perform workload analysis. In the illustrated example, the adjustment determining circuitry 228 utilizes the workload automation engine circuitry 234 and the machine learning circuitry 212 to determine reconfiguration settings of the computer system 104. In the illustrated example, the machine learning circuitry 212 utilizes a Bayesian machine learning algorithm to determine the reconfiguration settings, which is a black-box hyper parameter tuning algorithm. However, any other type of machine learning algorithm may be used additionally or alternatively, such as a support vector apriori algorithm, a k-means clustering algorithm, a decision tree, etc.

In operation, the adjustment determining circuitry 228 utilizes an interactive and iterative approach to determining the new configuration settings. In the illustrated example, the process begins with the machine learning circuitry 212. The machine learning circuitry 212 selects a configuration setting(s) to adjust, such as a system tunable, resident algorithm, etc. to determine a first configuration. The machine learning circuitry 212 may select the first configuration based on the reconfiguration trigger, the personalized workload 218, etc. For example, a reconfiguration trigger based on degradation of a battery may lead the machine learning circuitry 212 to first focus on adjusting power consumption by the processing circuitry. The machine learning circuitry 212 applies the machine learning algorithm and outputs the first configuration by selecting a value(s), an algorithm, etc. of the first configuration. In some examples, the machine learning circuitry 212 adjusts one configuration setting at a time. In some examples, the machine learning circuitry 212 adjusts more than one configuration setting at a time. The workload automation engine circuitry 234 receives the first configuration as an input. The workload automation engine circuitry 234 is structured to run the plurality of processes based on the received first configuration (including the first configuration setting(s)) and a current personalized workload 218 and to output power and/or performance results to the machine learning circuitry 212. The machine learning circuitry 212 applies the machine learning algorithm to determine a second configuration by selecting a new configuration setting value(s), algorithm(s), etc. for the second configuration based on the results of the workload automation engine circuitry 234. The machine learning circuitry 212 inputs the second configuration to the workload automation engine circuitry 234. The workload automation engine circuitry 234 runs the plurality of processes based on the input second configuration and the personalized workload 218 and outputs corresponding power and/or performance results. The iteration(s) (e.g., between the machine learning circuitry 212 and the workload automation engine circuitry 234) continues until a designated time limit is reached or until a desired improvement (determined by the computer system 104 and/or end user) is achieved based on output power and/or performance results. The machine learning circuitry 212 and/or the workload automation engine circuitry 234 outputs the new configuration settings to the adjustment determining circuitry 228. In some examples, the machine learning circuitry 212 output results to the adjustment determining circuitry 228, which proceeds to input the results to the workload automation engine circuitry 234 and vice versa. In such examples, the adjustment determining circuitry 228 determines whether to continue iterations.

To enable more effective reconfiguration of the individual computer system 104, a personalized adjustment objective is designed in some examples. For example, to adjust the computer system 104 configuration for optimal and/or otherwise improved system responsiveness, the workload automation engine circuitry 234 may open a portion of the frequently used applications and apply a weighted score function to account for differentiating the usage frequency within these frequently used applications. As another example, if the end user uses a full thermal budget of the CPU, the adjustment objective can be determined to maximize sustained frequency.

The configuration management circuitry 120 includes example policy manager circuitry 236 structured to generate instructions and/or recommendations based on the monitored data and/or based on analysis of the data by the data processing circuitry 206 and/or based on the adjustment determining circuitry 228. In some examples, the adjustment determining circuitry 228 recognizes the user profile 216 (e.g., normal context switch), but decides to adjust the system configuration by learning user behavior of application(s) usage during a specific duration of time (such as during specific hours, days, months etc.). The configuration adjustment circuitry 224 learns the user's most frequently used applications during the specific duration of time and generates a set of example personalized knobs 238 during the specific duration as inputs to example policy manager circuitry 236. The personalized knobs 238 may include CPU utilization per application, memory utilization per application, memory and CPU utilization of foreground applications and background applications, memory errors, display requests, audio streams etc.

The policy manager circuitry 236 is structured to generate a set of analyzed recommendation(s) (e.g., reason(s)) as an input to example resource management circuitry 240. The example resource management circuitry 240 is structured to receive the analyzed recommendation(s) as inputs and to respond accordingly. For example, the policy manager circuitry 236 may determine that a large number of idle background applications are running on the computer system 104, which have high CPU utilization. The resource management circuitry 240 may consider such a determination and decide to release at least one of the background applications. In some examples, the resource management circuitry 240 provides the recommendation(s) to a command manager user interface (e.g., command manager user interface circuitry 128) to allow an end user to decide whether to take a specific action.

In some examples, the policy manager circuitry 236 analyzes usage data and categorizes the user profile 216 based on the usage data to determine and/or to predict the users' behavior on application usage (such as creator user, agile worker user etc.). Such information may be used to predict an application(s) to be preloaded ahead of a pre-determined time and/or during reboot. For example, if policy manager circuitry 236 predicts a specific user typically (e.g., over a threshold amount) uses a presentation application or a spreadsheet application in the morning by 10 am, the policy manager circuitry 236 may recommend the resource management circuitry 240 instruct application launching circuitry (e.g., application launching circuitry 126) to launch the application ahead of the pre-determined time.

The example policy manager circuitry 236 is further structured to suggest actions to be taken in response to memory pressure increasing and/or memory utilization reaching certain threshold. For example, if the policy manager circuitry 236 determines that memory utilization is about to reach a threshold (e.g. within 5% threshold), the policy manager circuitry 236 provides instructions and/or recommendations to the resource management circuitry 240 to respond accordingly and/or to provide options to the end user to preemptively avoid memory pressure. For example, if the computer system 104 includes more than one display, the resource management circuitry 240 may advise the end user to run an application on a lower resolution display until it projects to high resolution display. If memory pressure is reached, depending on the reasons, the policy manager circuitry 236 may take a responsive action. For example, if the memory pressure is caused by background applications, the policy manager circuitry 236 may determine whether the applications are critical applications (e.g. audio stream and anti-virus running at background are considered as critical applications) and keep the critical applications alive. In some examples, the memory pressure is caused by the computer system 104 saving application contexts over time. In such examples, the policy manager circuitry 236 may recommend stopping the application(s) that occupy most of the memory.

In some examples, the configuration management circuitry 120 includes means monitoring user usage and hardware component conditions of the electronic device 102. For example, the means for monitoring may be implemented by example system monitoring circuitry 202. In some examples, the example system monitoring circuitry 202 may be instantiated by processor circuitry such as the example processor circuitry 912 of FIG. 9. For instance, the system monitoring circuitry 202 may be instantiated by, the example general purpose processor circuitry 1000 of FIG. 10 executing machine executable instructions such as that implemented by at least block 302, 304 of FIG. 3. In some examples, the system monitoring circuitry 202 may be instantiated by hardware logic circuitry, which may be implemented by an ASIC or the FPGA circuitry 1100 of FIG. 11 structured to perform operations corresponding to the machine readable instructions. Additionally or alternatively, the system monitoring circuitry 202 may be instantiated by any other combination of hardware, software, and/or firmware. For example, the example system monitoring circuitry 202 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In some examples, the configuration management circuitry 120 includes means for triggering reconfiguration. For example, the means for triggering reconfiguration may be implemented by example data processing circuitry 206. In some examples, the data processing circuitry 206 may be instantiated by processor circuitry such as the example processor circuitry 912 of FIG. 9. For instance, the data processing circuitry 206 may be instantiated by the example general purpose processor circuitry 1000 of FIG. 10 executing machine executable instructions such as that implemented by at least blocks 306 of FIG. 3 and 402-416 of FIG. 4. In some examples, the data processing circuitry 206 may be instantiated by hardware logic circuitry, which may be implemented by an ASIC or the FPGA circuitry 1100 of FIG. 11 structured to perform operations corresponding to the machine readable instructions. Additionally or alternatively, the data processing circuitry 206 may be instantiated by any other combination of hardware, software, and/or firmware. For example, the data processing circuitry 206 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In some examples, the configuration management circuitry 120 includes means for reconfiguring the electronic device. For example, the means for reconfiguring the electronic device may be implemented by example configuration adjustment circuitry 224. In some examples, the configuration adjustment circuitry 224 may be instantiated by processor circuitry such as the example processor circuitry 912 of FIG. 9. For instance, the configuration adjustment circuitry 224 may be instantiated by the example general purpose processor circuitry 1000 of FIG. 10 executing machine executable instructions such as that implemented by at least blocks 310, 312 of FIG. 3, 502-512 of FIG. 5, and 602-616 of FIG. 6. In some examples, the configuration adjustment circuitry 224 may be instantiated by hardware logic circuitry, which may be implemented by an ASIC or the FPGA circuitry 1100 of FIG. 11 structured to perform operations corresponding to the machine readable instructions. Additionally or alternatively, the configuration adjustment circuitry 224 may be instantiated by any other combination of hardware, software, and/or firmware. For example, the configuration adjustment circuitry 224 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

While an example manner of implementing the configuration management circuitry 120 of FIG. 1 is illustrated in FIG. 2, one or more of the elements, processes, and/or devices illustrated in FIG. 2 may be combined, divided, re-arranged, omitted, eliminated, and/or implemented in any other way. Further, the example system monitoring circuitry 202, example counter(s) 204, example data processing circuitry 206, example machine learning circuitry 212, example user interface circuitry 220, example configuration adjustment circuitry 224, example trigger receiving circuitry 226, example adjustment determining circuitry 228, example workload automation engine circuitry 234, example policy manager circuitry 236, example memory management circuitry 240, and/or, more generally, the example configuration management circuitry 120 of FIG. 2, may be implemented by hardware alone or by hardware in combination with software and/or firmware. Thus, for example, any of the example system monitoring circuitry 202, example counter(s) 204, example data processing circuitry 206, example machine learning circuitry 212, example user interface circuitry 220, example configuration adjustment circuitry 224, example trigger receiving circuitry 226, example adjustment determining circuitry 228, example workload automation engine circuitry 234, example policy manager circuitry 236, example memory management circuitry 240 and/or, more generally, the example configuration management circuitry 120, could be implemented by processor circuitry, analog circuit(s), digital circuit(s), logic circuit(s), programmable processor(s), programmable microcontroller(s), graphics processing unit(s) (GPU(s)), digital signal processor(s) (DSP(s)), application specific integrated circuit(s) (ASIC(s)), programmable logic device(s) (PLD(s)), and/or field programmable logic device(s) (FPLD(s)) such as Field Programmable Gate Arrays (FPGAs). Further still, the example configuration management circuitry 120 of FIG. 2 may include one or more elements, processes, and/or devices in addition to, or instead of, those illustrated in FIG. 2, and/or may include more than one of any or all of the illustrated elements, processes and devices.

A flowchart representative of example hardware logic circuitry, machine readable instructions, hardware implemented state machines, and/or any combination thereof for implementing the configuration management circuitry 120 of FIG. 2 is shown in FIGS. 3-8. The machine readable instructions may be one or more executable programs or portion(s) of an executable program for execution by processor circuitry, such as the processor circuitry 912 shown in the example processor platform 900 discussed below in connection with FIG. 9 and/or the example processor circuitry discussed below in connection with FIGS. 10 and/or 11. The program may be embodied in software stored on one or more non-transitory computer readable storage media such as a compact disk (CD), a floppy disk, a hard disk drive (HDD), a solid-state drive (SSD), a digital versatile disk (DVD), a Blu-ray disk, a volatile memory (e.g., Random Access Memory (RAM) of any type, etc.), or a non-volatile memory (e.g., electrically erasable programmable read-only memory (EEPROM), FLASH memory, an HDD, an SSD, etc.) associated with processor circuitry located in one or more hardware devices, but the entire program and/or parts thereof could alternatively be executed by one or more hardware devices other than the processor circuitry and/or embodied in firmware or dedicated hardware. The machine readable instructions may be distributed across multiple hardware devices and/or executed by two or more hardware devices (e.g., a server and a client hardware device). For example, the client hardware device may be implemented by an endpoint client hardware device (e.g., a hardware device associated with a user) or an intermediate client hardware device (e.g., a radio access network (RAN)) gateway that may facilitate communication between a server and an endpoint client hardware device). Similarly, the non-transitory computer readable storage media may include one or more mediums located in one or more hardware devices. Further, although the example program is described with reference to the flowchart illustrated in FIG. 9, many other methods of implementing the example configuration management circuitry 120 of FIG. 2 may alternatively be used. For example, the order of execution of the blocks may be changed, and/or some of the blocks described may be changed, eliminated, or combined. Additionally or alternatively, any or all of the blocks may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more hardware devices (e.g., a single-core processor (e.g., a single core central processor unit (CPU)), a multi-core processor (e.g., a multi-core CPU), etc.) in a single machine, multiple processors distributed across multiple servers of a server rack, multiple processors distributed across one or more server racks, a CPU and/or a FPGA located in the same package (e.g., the same integrated circuit (IC) package or in two or more separate housings, etc.).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., as portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or other machine. For example, the machine readable instructions may be stored in multiple parts, which are individually compressed, encrypted, and/or stored on separate computing devices, wherein the parts when decrypted, decompressed, and/or combined form a set of machine executable instructions that implement one or more operations that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc., in order to execute the machine readable instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C #, Perl, Python, JavaScript, HyperText Markup Language (HTML), Structured Query Language (SQL), Swift, etc.

As mentioned above, the example operations of FIGS. 3-8 may be implemented using executable instructions (e.g., computer and/or machine readable instructions) stored on one or more non-transitory computer and/or machine readable media such as optical storage devices, magnetic storage devices, an HDD, a flash memory, a read-only memory (ROM), a CD, a DVD, a cache, a RAM of any type, a register, and/or any other storage device or storage disk in which information is stored for any duration (e.g., for extended time periods, permanently, for brief instances, for temporarily buffering, and/or for caching of the information). As used herein, the terms non-transitory computer readable medium and non-transitory computer readable storage medium are expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements or method actions may be implemented by, e.g., the same entity or object. Additionally, although individual features may be included in different examples or claims, these may possibly be combined, and the inclusion in different examples or claims does not imply that a combination of features is not feasible and/or advantageous.

Figure 3:
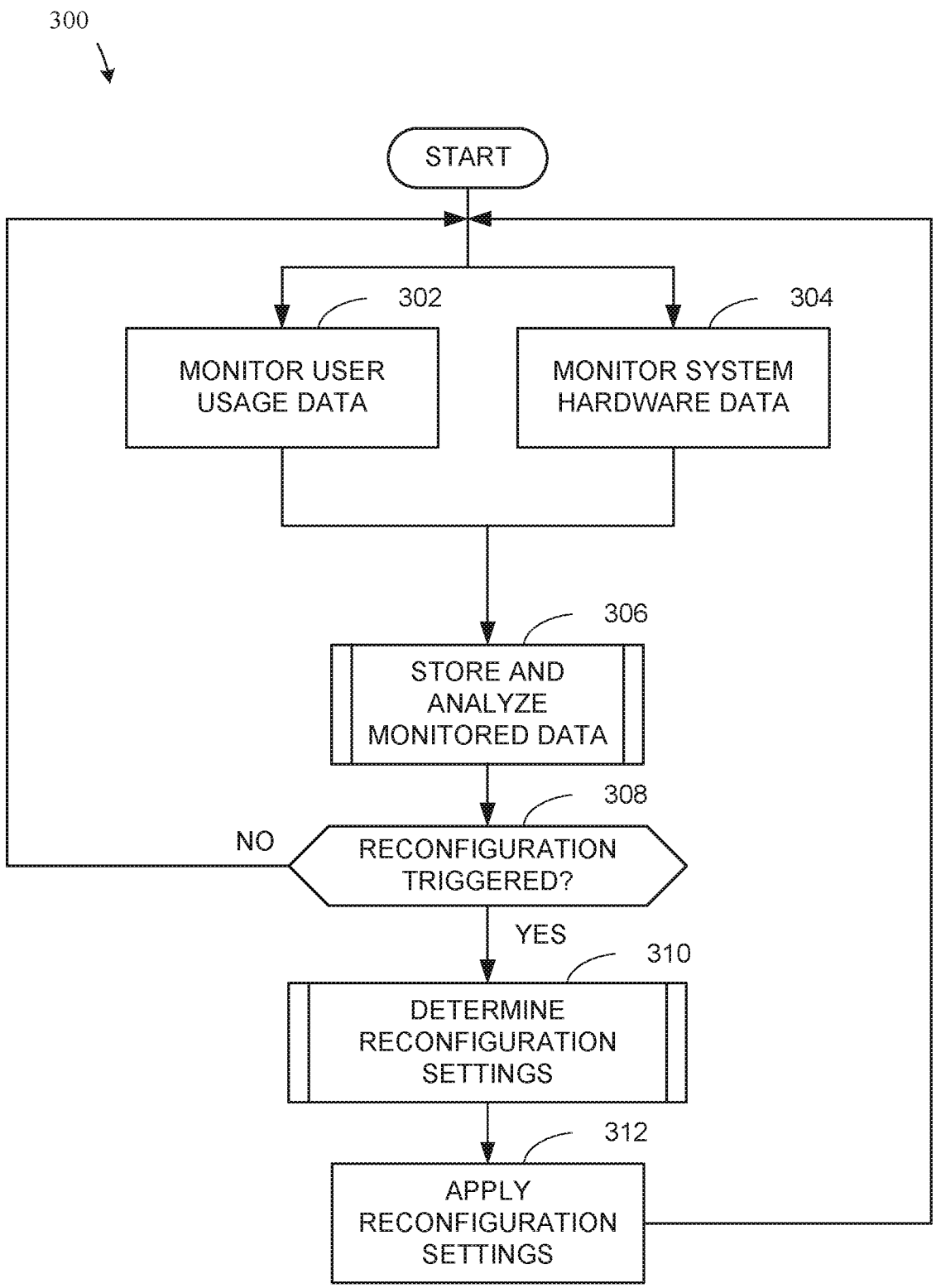
FIGS. 3-7 are flowcharts representative of example machine readable instructions and/or example operations that may be executed by example processor circuitry to implement the example configuration management circuitry of FIGS. 1 and 2.

FIG. 3 is a flowchart representative of example machine readable instructions and/or example operations 300 that may be executed and/or instantiated by processor circuitry to reconfigure a computer system (e.g., computer system 104) of an electronic device (e.g., electronic device 102) in response to a threshold change in operation of the electronic device 102. The machine readable instructions and/or operations 300 of FIG. 3 begin at block 302, at which the example system monitoring circuitry 202 monitors user usage data. For example, the system monitoring circuitry 202 monitors CPU utilization, memory utilization, foreground and/or background application launching statistics, etc. The system monitoring circuitry 202 may utilize a counter (e.g., counter(s) 204), sensor(s) (e.g., sensor(s) 122), and/or any other suitable monitoring mechanism, such as an application profiler. At block 304, the example system monitoring circuitry 202 monitors system hardware data. For example, the system monitoring circuitry 202 monitors a hardware component such as a power source(s) (e.g., power source(s) 110), a fan (e.g., fan 114), processing circuitry (e.g., processing circuitry 108), etc. The system monitoring circuitry 202 may use a counter 204 and/or any other suitable monitoring mechanism.

At block 306, the example data processing circuitry 206 stores and analyzes the data (e.g., telemetry data) monitored by the system monitoring circuitry 202. For example, the data processing circuitry 206 receives data from the system monitoring circuitry 202 and stores the data in the example telemetry datastore 208. The data processing circuitry 206 further analyzes the data received from the system monitoring circuitry 202. For example, the data processing circuitry 206 analyzes the data to determine (e.g., detect) whether the computer system 104 experiences a change associated with the electronic device 102 (e.g., a change in usage of the electronic device 102 and/or a change in an environmental factor of the computer system 104). The data processing circuitry 206 determines whether to trigger reconfiguration based on the analysis of the data. In some examples, the data processing circuitry 206 triggers reconfiguration of the computer system 104 in response to a change in a usage pattern beyond a threshold, a context switch, and/or a change in a condition of a hardware component beyond a threshold.

At block 308, the trigger receiving circuitry 226 of the configuration adjustment circuitry 224 determines whether reconfiguration of the computer system 104 has been triggered. For example, reconfiguration may be triggered via the data processing circuitry 206, by an end user via a user interface (e.g., user interface circuitry 220), and/or via an IT management company (e.g., as a remote service). If the answer to block 308 is NO, control advances back to the beginning at which the system monitoring circuitry 202 continues to monitor user usage data (block 302) and system hardware data (block 304). If the answer to block 308 is YES, and reconfiguration is triggered, control advances to block 310. At block 310, the adjustment determining circuitry 228 determines a configuration to apply to the computer system 104. The adjustment determining circuitry 228 may determine the new configuration based on the change that triggered reconfiguration. For example, if the trigger for reconfiguration is based on a context change, the adjustment determining circuitry 228 may recognized the context change and determine the reconfiguration based on a previously configured user context using a system configuration model (e.g., system configuration model 230). At block 312, the configuration adjustment circuitry 224 applies the configuration as determined by the adjustment determining circuitry 228. Control then advances back to the beginning at which the system monitoring circuitry 202 continues to monitor user usage data (block 302) and system hardware data (block 304).

Figure 4:
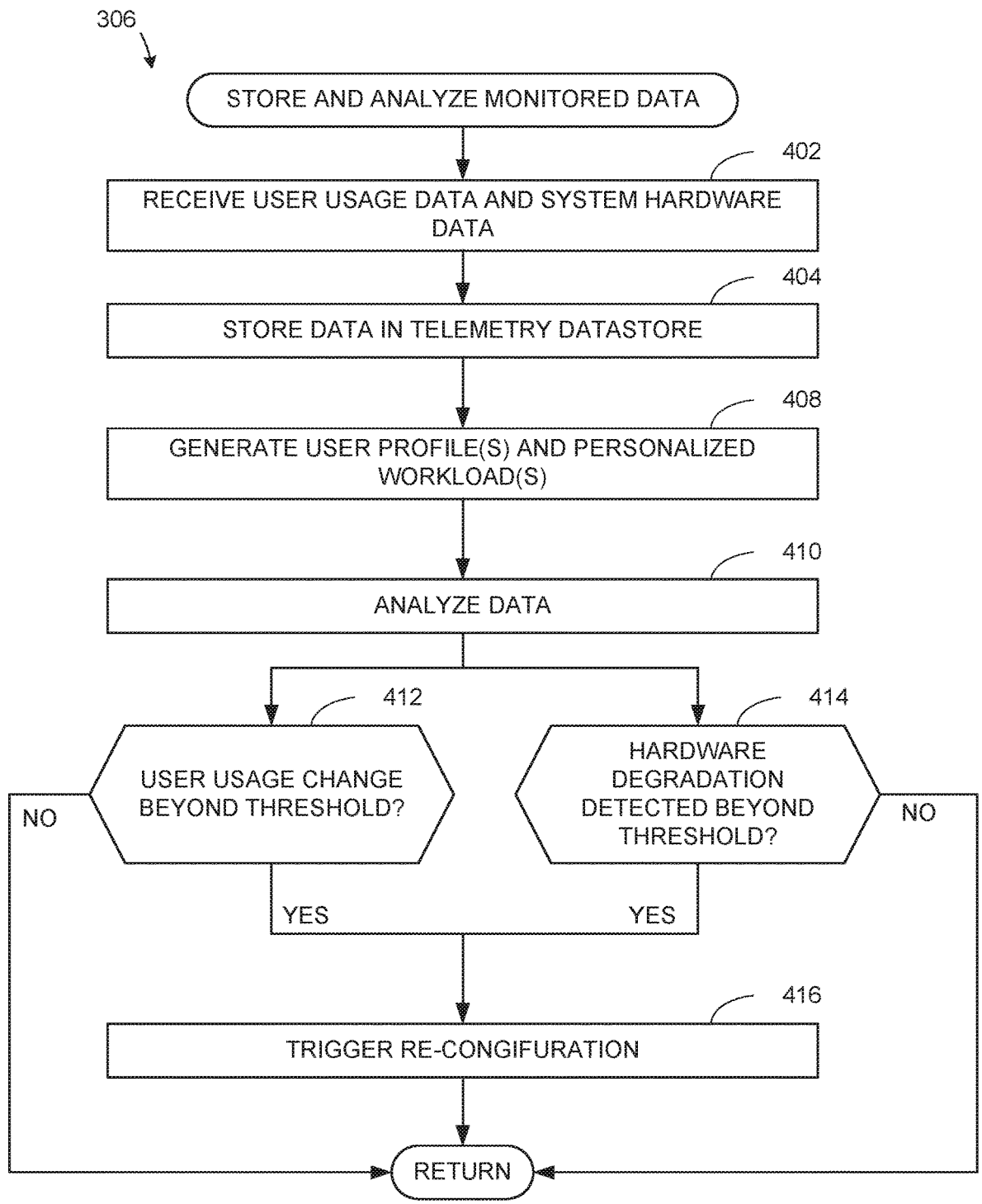

FIG. 4 is a flowchart representative of example machine readable instructions and/or example operations 306 that may be executed and/or instantiated by processor circuitry to store and analyze monitored data, such as telemetry data. One example of machine readable instructions and/or operations that may be used to implement operations of 306 are shown in FIG. 4. The operations 306 begin at block 402, at which the data processing circuitry 206 receives user usage data and system hardware data from the system monitoring circuitry 202. At block 404, the data processing circuitry 206 stores the data received from the system monitoring circuitry 202. In some examples, the data processing circuitry 206 may use a data processing model 214 to store the data received from the system monitoring circuitry 202. In some examples, the data processing circuitry 206 stores the data in the telemetry datastore 208.

During operation of the electronic device 102, the data processing circuitry 206 generates a user profile 216 and a personalized workload 218 based on the monitored data generated by the system monitoring circuitry 202 (block 408). For example, the user profile 216 may be based on a type of usage for which the user uses the electronic device 102, such as a content creation type usage, educator type usage, etc. The personalized workload 218, for example, may include the user's frequently used applications, their joint probabilities, etc. The data processing circuitry 206 stores the user profile 216 and the personalized workload 218 in an example database (e.g., databased 124). As noted above, a user may have more than one user profile 216 and/or more than one personalized workload 218. In some examples, the personalized workload 218 is associated with the user profile 216.

At block 410, the data processing circuitry 206 analyzes the data received from the system monitoring circuitry 202 to monitor usage and hardware conditions and to detect a change in the computer system 104 (e.g., in usage and/or hardware condition) beyond a threshold. For example, data processing circuitry 206 may recognize a change in a usage pattern of the electronic device 102 (e.g., change in user profile 216), a context switch (e.g., a change from a lightly threaded browser usage to a gaming usage), a change in an environmental factor (e.g., degradation of a hardware component, addition of memory, effects of malware, etc.) and/or any suitable change that would enable the computer system 104 to benefit from a reconfiguration. In some examples, the data processing circuitry 206 may use a data processing model 214 to analyze the data.

At block 412, the data processing circuitry 206 determines whether the data indicates a change in user usage beyond a threshold. For example, the data processing circuitry 206 may analyze the data and determine that the user of the electronic device 102 has changed a usage type (e.g., content creation usage type to an education usage type, mobile user to home user, etc.) In some examples, the data processing circuitry 206 determines that a change exists beyond a threshold, but recognizes the change as a normal context change (e.g., weekday worker to weekend gamer). If the answer to block 412 is NO, reconfiguration is not triggered based on a usage change and control advances to block 308 of FIG. 3. If the answer to block 412 is YES, control advances to block 416.

At block 414, the data processing circuitry 206 determines whether the data indicates a change in condition of a hardware component beyond a threshold. For example, the data processing circuitry 206 may determine based on an audio sensor 122 that a fan 114 is running continually during usage of the electronic device 102. The data processing circuitry 206 may determine that the constant fan noise indicates a CPU is working exceptionally hard and triggers reconfiguration accordingly. If the answer to block 414 is NO, reconfiguration is not triggered based on a change in a condition of a hardware component and control advances to block 308 of FIG. 3. If the answer to block 414 is YES, control advances to block 416. At block 416, the data processing circuitry 206 determines to trigger reconfiguration of the computer system 104. Control then advances to block 308 of FIG. 3.

Figure 5:
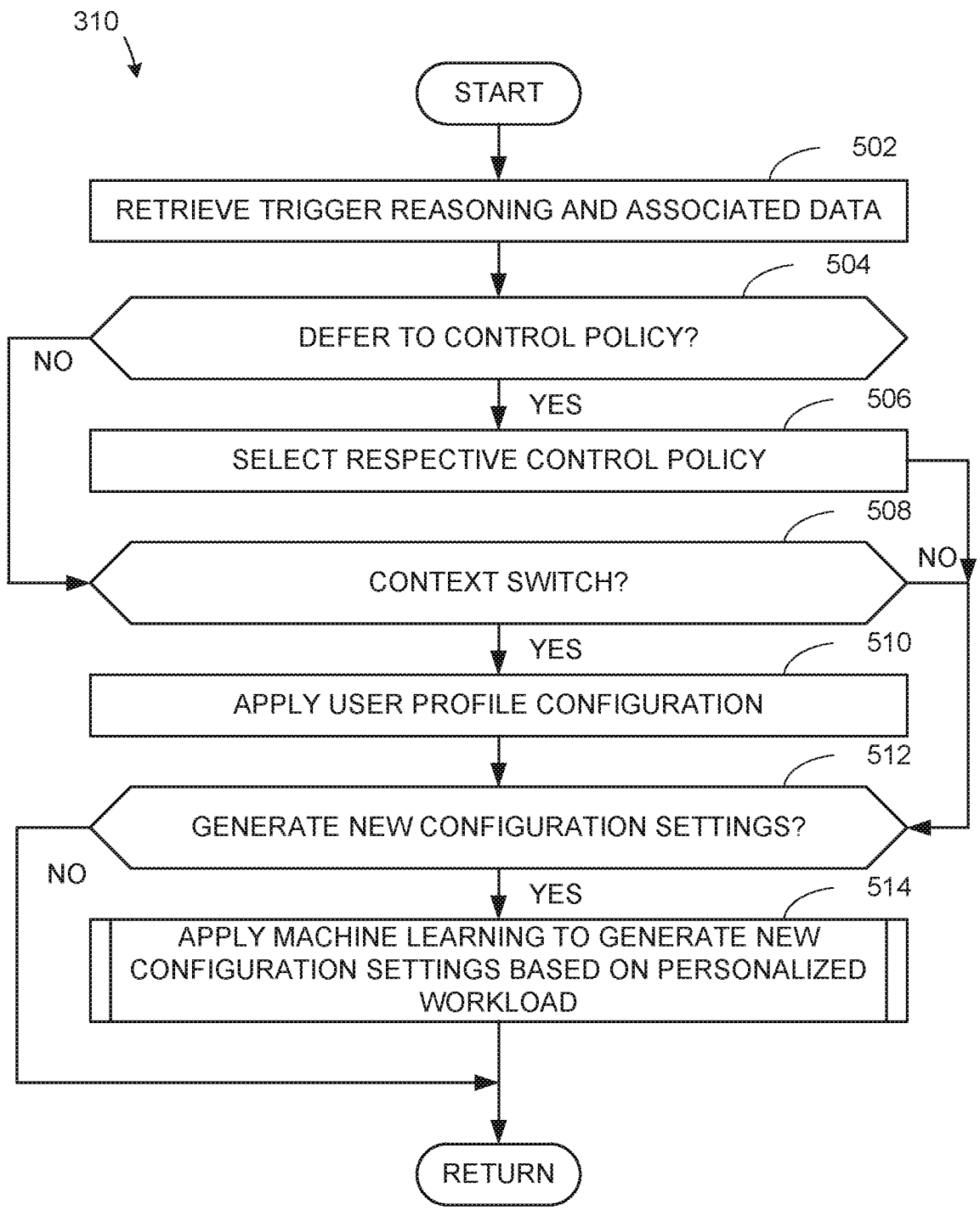

FIG. 5 is a flowchart representative of example machine readable instructions and/or example operations 310 that may be executed and/or instantiated by processor circuitry to determine reconfiguration settings of the computer system 104. One example of machine readable instructions and/or operations that may be used to implement operations of 310 are shown in FIG. 5. Operations 310 begin at block 502 at which the adjustment determining circuitry 228 retrieves a reasoning for the trigger and associated data for which reconfiguration was triggered. Based on the reasoning and the data, the adjustment determining circuitry 228 determines whether to defer to a control policy (e.g., control policy(ies) 232) (block 504). For example, if the data indicates that the usage type for which reconfiguration was triggered is a usage type for which a control policy 232 is available, the adjustment determining circuitry 228 utilizes the control policy 232 to determine a new configuration. If the answer to block 504 is YES, the adjustment determining circuitry 228 selects a respective control policy 232 (block 506) and selects a new configuration accordingly. Control then advances to block 512 at which the adjustment determining circuitry 228 determines whether to apply a machine learning algorithm to generate new configuration setting, discussed further below. If the answer to block 504 is NO, control advances to block 508.

At block 508, the adjustment determining circuitry 228 determines, based on the trigger reasoning and associated data, whether a user profile 216 is recognized. For example, reconfiguration may have been triggered based on a normal context switch (e.g., lightly threaded browsing context to a gaming context). If the answer to block 508 is YES, control advances to block 510 at which the adjustment determining circuitry 228 determines to apply the user profile 216 configuration that has been recognized. For example, the adjustment determining circuitry 228 may determine to apply a configuration based on a configuration model 230 associated with the recognized user profile 216. Control then advances to block 512. If the answer to block 508 is NO, control advances to block 512. At block 512, the adjustment determining circuitry 228 determines whether to generate new configuration settings based on the trigger reasoning, associated data, a control policy, and/or a recognized user profile 216. For example, the adjustment determining circuitry 228 may determine that the usage for which configuration was triggered does not relate to a control policy 232 and/or is not a normal context switch. Additionally or alternatively, the adjustment determining circuitry 228 may recognize a similar user profile 216 but a change still exists beyond a threshold. In such examples, the adjustment determining circuitry 228 may determine to generate new configuration settings. If the answer to block 512 is NO, control advances to block 312 of FIG. 3, at which the configuration adjustment circuitry 224 applies the configuration selected by the adjustment determining circuitry 228. If the answer to block 512 if YES, the adjustment determining circuitry 228 applies machine learning to generate a new configuration based on the monitored data and personalized workload 218.

Figure 6:
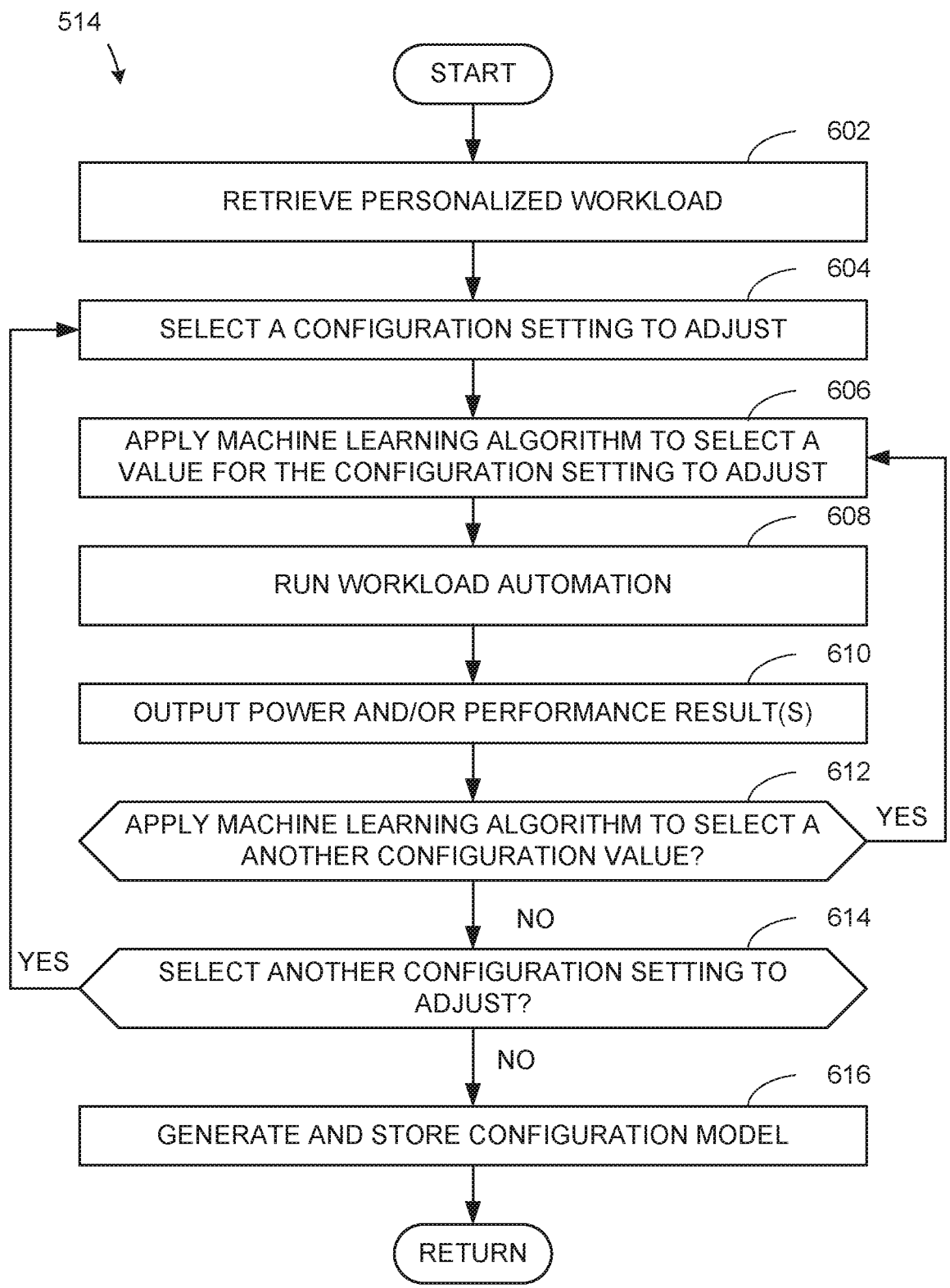

FIG. 6 is a flowchart representative of example machine readable instructions and/or example operations 514 that may be executed and/or instantiated by processor circuitry to determine new reconfiguration settings. One example of machine readable instructions and/or operations that may be used to implement operations of 514 are shown in FIG. 6. Operations 514 begin at block 602 at which the adjustment determining circuitry 228 retrieves the personalized workload 218 for which reconfiguration was triggered and inputs the personalized workload 218, trigger reasoning, and associated data into machine learning circuitry (e.g., machine learning circuitry 212). At block 604, to the machine learning circuitry 212 selects a first configuration(s) (e.g., setting, configuration setting, etc.) to adjust. For example, the machine learning circuitry 212 may select the first configuration(s) based on the trigger reasoning, personalized workload 218, etc. At block 606, the machine learning circuitry 212 applies a machine learning algorithm (e.g., a Bayesian algorithm) to select a first value for the first configuration setting(s). The machine learning circuitry 212 provides a first configuration, including the first value for the first configuration setting(s) to adjust, to the workload automation engine circuitry 234.

At block 608, the workload automation engine circuitry 234 runs a workload automation based on the personalized workload 218 and the first configuration. For example, the workload automation engine circuitry 234 may run a plurality of processes based on the first configuration and the personalized workload 218. At block 610, the workload automation engine circuitry 234 outputs a power and/or performance result of the workload run based on the personalized workload and the first configuration to the machine learning circuitry 212. Based on the result of the workload run and/or based on an optimization goal, the machine learning circuitry 212 determines whether to apply a machine learning algorithm to select a second value for the first configuration setting(s). If the answer to block 612 is YES, control returns to block 606 at which the machine learning circuitry 212 applies the machine learning algorithm to select a second value for the first configuration setting(s). Blocks 606-612 iterate until the answer to block 612 is NO. If the answer to block 612 is NO, control advances to block 614 at which the adjustment determining circuitry 228 determines whether to select a second configuration setting(s) to adjust. The decision may be based on power and/or performance results from the workload run, based on an optimization goal, etc. If the answer to block 614 is YES, control returns to block 604. Block 604-614 iterate until the answer to block 614 is NO, at which control advances to block 616.

At block 616, the adjustment determining circuitry 228 generates a system configuration based on the selected configuration values determined by blocks 604-614. In some examples, the adjustment determining circuitry 228 generates and stores a configuration model 230 in the configuration adjustment circuitry 224. In some examples, the configuration model 230 is associated with the respective user profile 216 and/or the respective personalized workload 218 for which reconfiguration was triggered. Control then returns to block 312 of FIG. 3 at which the configuration adjustment circuitry 224 applies the determined configuration settings.

Figure 7:
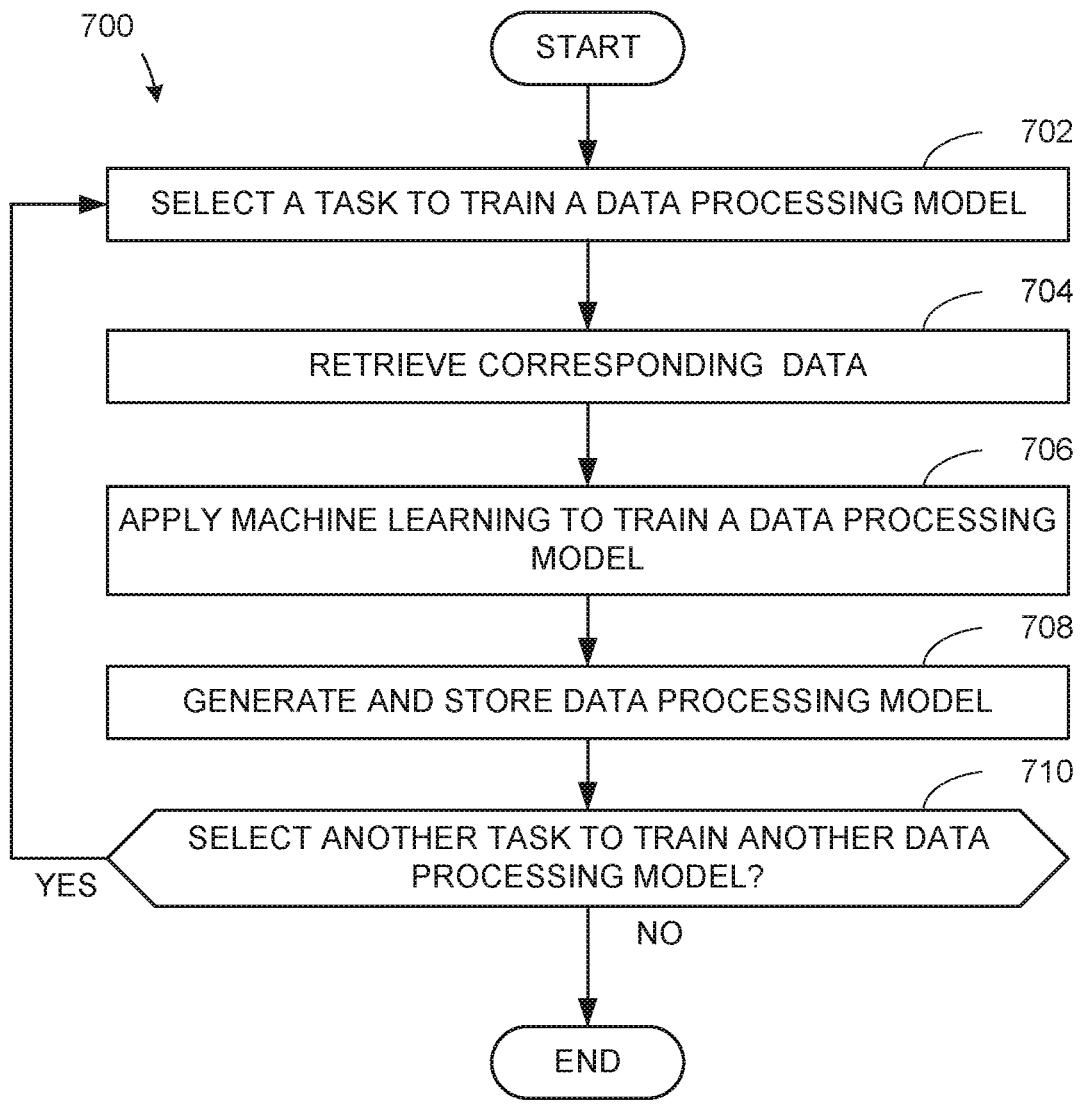

FIG. 7 is a flowchart representative of example machine readable instructions and/or example operations 700 that may be executed and/or instantiated by processor circuitry to train a data processing model 214. The machine readable instructions and/or operations 700 of FIG. 7 begin at block 702 at which point the data processing circuitry 206 selects a task to train a data processing model 214. For example, the data processing circuitry 206 may determine to train a data processing model 214 to store data received from the system monitoring circuitry 202, to analyze data, to recognize a context switch, etc. At block 704, the machine learning circuitry 212 retrieves corresponding data that is associated with a task for which the machine learning circuitry 212 is training the data processing model 214. For example, the machine learning circuitry 212 may retrieve all current data if the machine learning circuitry 212 is training a data processing model 214 to store data received from the system monitoring circuitry 202. In some examples, the machine learning circuitry 212 is training a data processing model 214 to recognize a context switch. In such examples, the machine learning circuitry 212 may retrieve data associated with a specific user profile 216.

At block 706, the machine learning circuitry 212 applies a machine learning algorithm to train a data processing model 214. For example, the machine learning circuitry 212 may apply a Bayesian algorithm to the retrieved data to train the data processing model 214. At block 708, the machine learning circuitry 212 generates the data processing model 214 and stores the model 214. For example, the machine learning circuitry 212 may store the data processing model 214 in the data processing circuitry 206. At block 710, the data processing circuitry 206 determines whether to select another task to train another data processing model 214. If the answer to block 710 is YES, control returns to block 702. Block 702-708 repeat until the answer to block 710 is NO.

Figure 8:
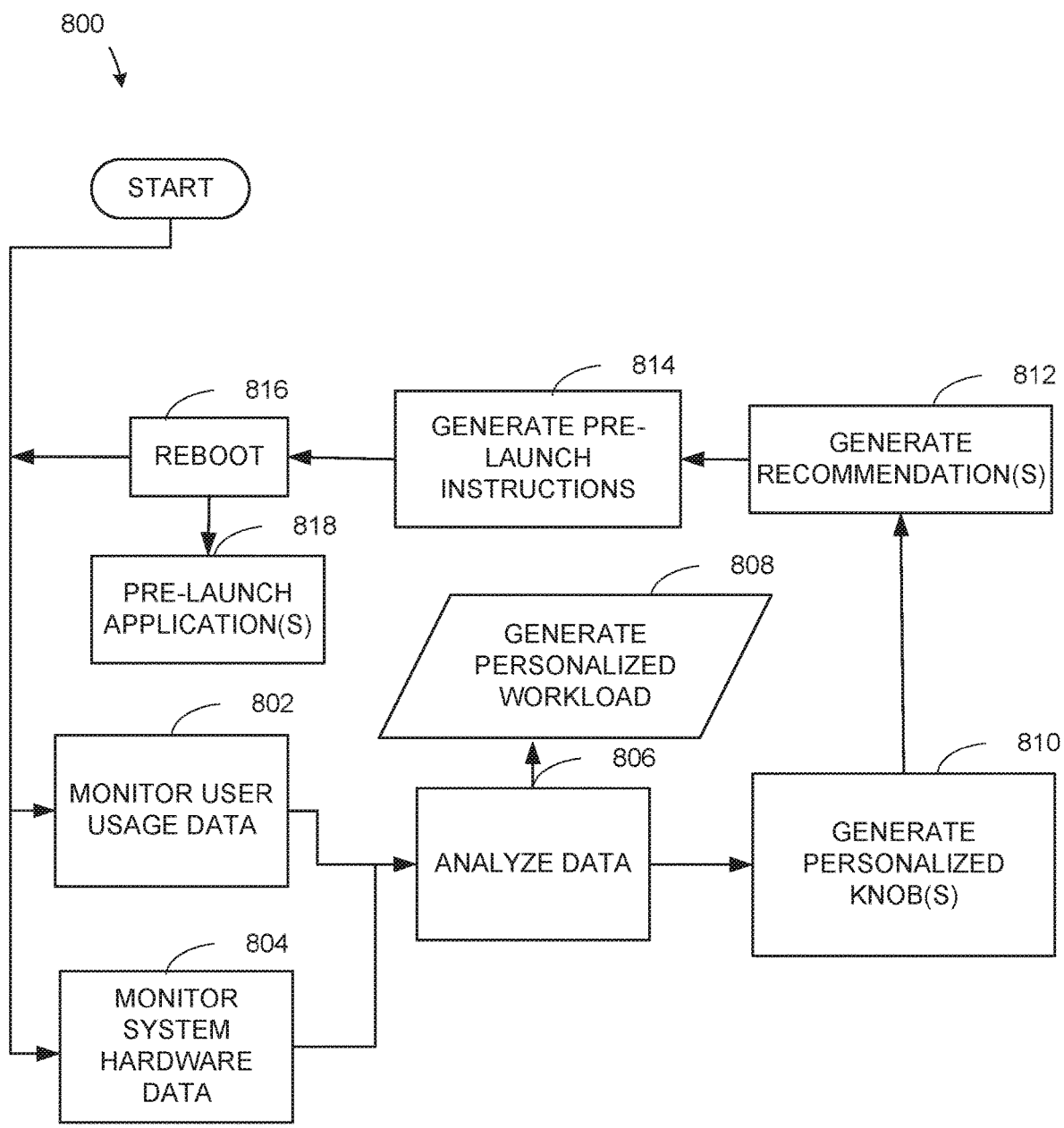
FIG. 8 is another flowchart representative of example machine readable instructions and/or example operations that may be executed by example processor circuitry to implement the example configuration management circuitry of FIGS. 1 and 2.

FIG. 8 is an example implementation of the example system 100 to reconfigure the computer system 104 of FIG. 1. FIG. 8 is a flowchart representative of example machine readable instructions and/or example operations 800 that may be executed and/or instantiated by processor circuitry to generate instant application instructions for a computer system (e.g., computer system 104) of an electronic device (e.g., electronic device 102). The machine readable instructions and/or operations 800 of FIG. 8 begin at block 802, at which the system monitoring circuitry 202 monitors user usage data. For example, the system monitoring circuitry 202 may utilize a counter 204, sensor 122, etc. to monitors CPU utilization, memory utilization, foreground and/or background application launching statistics, etc. At block 804, the example system monitoring circuitry 202 monitors system hardware data. For example, the system monitoring circuitry 202 may utilize a counter 204, etc. to monitor a hardware component such as a power source 110, a fan 114, etc. At block 806, the data processing circuitry 206 analyzes the data monitored by the system monitoring circuitry 202. For example, the data processing circuitry 206 may analyze the data to generate a user profile 216. At block 808, the data processing circuitry 206 generates a personalized workload 218 based on the analyzed data.

At block 810, the data processing circuitry 206 provides application usage data to policy manager circuitry (e.g., policy manager circuitry 236) corresponding to a certain duration of time based on analysis of the data received from the system monitoring circuitry 202. For example, the data processing circuitry 206 may provide data related to application usage, memory utilization, etc. during workday hours (e.g., 8 am-5 pm, Monday through Friday). At block 810, the policy manager circuitry 236 generates at least one personalized knob (e.g., personalized knob(s) 238) for the specific duration of time. For example, the personalized knob(s) 238 may include CPU utilization per application, memory utilization per application, memory errors, display requests, audio streams etc.

At block 812, the policy manager circuitry 236 generates an analyzed recommendation(s) to provide to example resource management circuitry (e.g., resource management circuitry 240). The analyzed recommendation(s) may be based on user usage data to determine and/or to predict the users' behavior on application usage (e.g., creator application usage, agile worker application usage, etc.). Such information is used to predict which application(s) to pre-launch ahead of a specific day and/or time and/or during a reboot. For example, the policy manager circuitry 236 may predict that the user typically uses a presentation application or a spreadsheet application in the morning by 10 am Monday through Friday. The policy manager circuitry 236 may recommend that these applications be preloaded before 10 am Monday through Friday.

At block 814, the resource management circuitry 240 generates pre-launch instructions. For example, the resource management circuitry 240 may generate instructions to pre-launch the presentation application in the morning by 10 am Monday through Friday based on a recommendation to do so by the policy manager circuitry 236. At block 816, the electronic device 102 and the computer system 104 reboot. In some examples, a user may reboot the electronic device 102. In some examples, the reboot may be in response to an update to the computer system 104 that requires the reboot. At block 818, application launching circuitry (e.g., application launching circuitry 126) pre-launches the application (e.g., the presentation application) at a specific time (e.g., Monday through Friday by 10 am) as instructed by the resource management circuitry 240. Control then advances to the beginning at which the system monitoring circuitry 202 monitors user usage data (block 802) and system hardware data (block 804).

Figure 9:
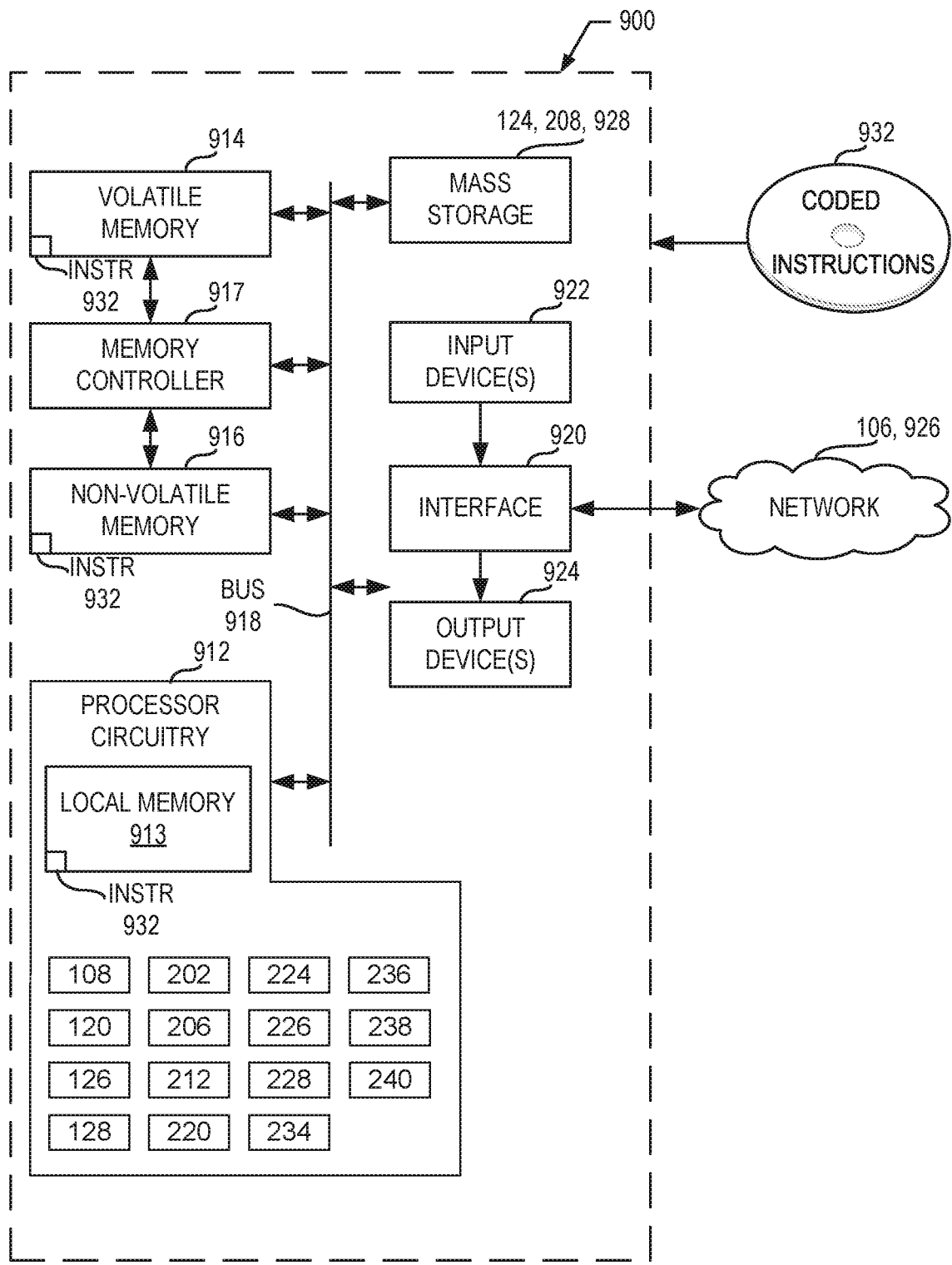
FIG. 9 is a block diagram of an example processing platform including processor circuitry structured to execute the example machine readable instructions and/or the example operations of FIGS. 3, 4, 5, 6, 7 and/or 8 to implement the configuration management circuitry of FIGS. 1 and 2.

FIG. 9 is a block diagram of an example processor platform 900 structured to execute and/or instantiate the machine readable instructions and/or operations of FIGS. 3-8 to implement the configuration management circuitry 120 of FIGS. 1 and/or 2. The processor platform 900 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset (e.g., an augmented reality (AR) headset, a virtual reality (VR) headset, etc.) or other wearable device, or any other type of computing device.

The processor platform 900 of the illustrated example includes processor circuitry 912. The processor circuitry 912 of the illustrated example is hardware. For example, the processor circuitry 912 can be implemented by one or more integrated circuits, logic circuits, FPGAs microprocessors, CPUs, GPUs, DSPs, and/or microcontrollers from any desired family or manufacturer. The processor circuitry 912 may be implemented by one or more semiconductor based (e.g., silicon based) devices. In this example, the processor circuitry 912 the example system monitoring circuitry 202, example counter(s) 204, example data processing circuitry 206, example machine learning circuitry 212, example user interface circuitry 220, example configuration adjustment circuitry 224, example trigger receiving circuitry 226, example adjustment determining circuitry 228, example workload automation engine circuitry 234, example policy manager circuitry 236, and example resource management circuitry 240.

The processor circuitry 912 of the illustrated example includes a local memory 913 (e.g., a cache, registers, etc.). The processor circuitry 912 of the illustrated example is in communication with a main memory including a volatile memory 914 and a non-volatile memory 916 by a bus 918. The volatile memory 914 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 916 may be implemented by flash memory and/or any other desired type of memory device. Access to the main memory 914, 916 of the illustrated example is controlled by a memory controller 917.

The processor platform 900 of the illustrated example also includes interface circuitry 920. The interface circuitry 920 may be implemented by hardware in accordance with any type of interface standard, such as an Ethernet interface, a universal serial bus (USB) interface, a Bluetooth® interface, a near field communication (NFC) interface, a Peripheral Component Interconnect (PCI) interface, and/or a Peripheral Component Interconnect Express (PCIe) interface.

In the illustrated example, one or more input devices 922 are connected to the interface circuitry 920. The input device(s) 922 permit(s) a user to enter data and/or commands into the processor circuitry 912. The input device(s) 922 can be implemented by, for example, an audio sensor, a microphone, a camera (still or video), a keyboard, a button, a mouse, a touchscreen, a track-pad, a trackball, an isopoint device, and/or a voice recognition system.

One or more output devices 924 are also connected to the interface circuitry 920 of the illustrated example. The output device(s) 924 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuitry 920 of the illustrated example, thus, typically includes a graphics driver card, a graphics driver chip, and/or graphics processor circuitry such as a GPU.

The interface circuitry 920 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 926. The communication can be by, for example, an Ethernet connection, a digital subscriber line (DSL) connection, a telephone line connection, a coaxial cable system, a satellite system, a line-of-site wireless system, a cellular telephone system, an optical connection, etc.

The processor platform 900 of the illustrated example also includes one or more mass storage devices 928 to store software and/or data. Examples of such mass storage devices 928 include magnetic storage devices, optical storage devices, floppy disk drives, HDDs, CDs, Blu-ray disk drives, redundant array of independent disks (RAID) systems, solid state storage devices such as flash memory devices and/or SSDs, and DVD drives.

The machine executable instructions 932, which may be implemented by the machine readable instructions of FIGS. 3-8, may be stored in the mass storage device 928, in the volatile memory 914, in the non-volatile memory 916, and/or on a removable non-transitory computer readable storage medium such as a CD or DVD.

Figure 10:
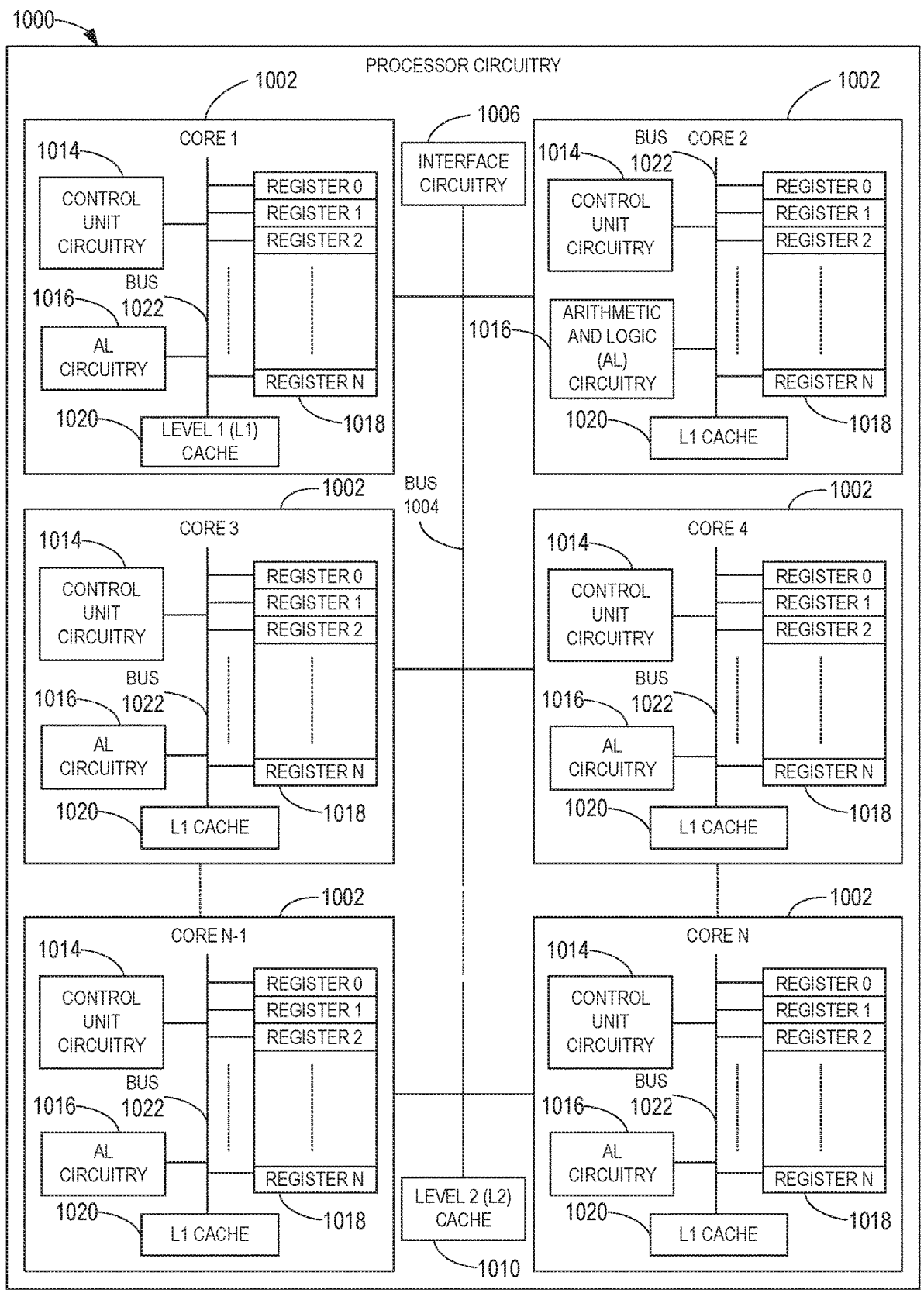
FIG. 10 is a block diagram of an example implementation of the processor circuitry of FIG. 9.

FIG. 10 is a block diagram of an example implementation of the processor circuitry 912 of FIG. 9. In this example, the processor circuitry 912 of FIG. 9 is implemented by a general purpose microprocessor 1000. The general purpose microprocessor 1000 executes some or all of the machine readable instructions of the flows of FIGS. 3-8 to effectively instantiate the configuration management circuitry 120 of FIG. 2 as logic circuits to perform the operations corresponding to those machine readable instructions. In some examples, the configuration management circuitry 120 of FIG. 2 is instantiated by the hardware circuits of the microprocessor 1000 in combination with the instructions. For example, the microprocessor 1000 may implement multicore hardware circuitry such as a CPU, a DSP, a GPU, an XPU, etc. Although it may include any number of example cores 1002 (e.g., 1 core), the microprocessor 1000 of this example is a multi-core semiconductor device including N cores. The cores 1002 of the microprocessor 1000 may operate independently or may cooperate to execute machine readable instructions. For example, machine code corresponding to a firmware program, an embedded software program, or a software program may be executed by one of the cores 1002 or may be executed by multiple ones of the cores 1002 at the same or different times. In some examples, the machine code corresponding to the firmware program, the embedded software program, or the software program is split into threads and executed in parallel by two or more of the cores 1002. The software program may correspond to a portion or all of the machine readable instructions and/or operations represented by the flowchart of FIGS. 3-8

The cores 1002 may communicate by an example first bus 1004. In some examples, the first bus 1004 may implement a communication bus to effectuate communication associated with one(s) of the cores 1002. For example, the first bus 1004 may implement at least one of an Inter-Integrated Circuit (I2C) bus, a Serial Peripheral Interface (SPI) bus, a PCI bus, or a PCIe bus. Additionally or alternatively, the first bus 1004 may implement any other type of computing or electrical bus. The cores 1002 may obtain data, instructions, and/or signals from one or more external devices by example interface circuitry 1006. The cores 1002 may output data, instructions, and/or signals to the one or more external devices by the interface circuitry 1006. Although the cores 1002 of this example include example local memory 1020 (e.g., Level 1 (L1) cache that may be split into an L1 data cache and an L1 instruction cache), the microprocessor 1000 also includes example shared memory 1010 that may be shared by the cores (e.g., Level 2 (L2_cache)) for high-speed access to data and/or instructions. Data and/or instructions may be transferred (e.g., shared) by writing to and/or reading from the shared memory 1010. The local memory 1020 of each of the cores 1002 and the shared memory 1010 may be part of a hierarchy of storage devices including multiple levels of cache memory and the main memory (e.g., the main memory 914, 916 of FIG. 9). Typically, higher levels of memory in the hierarchy exhibit lower access time and have smaller storage capacity than lower levels of memory. Changes in the various levels of the cache hierarchy are managed (e.g., coordinated) by a cache coherency policy.

Each core 1002 may be referred to as a CPU, DSP, GPU, etc., or any other type of hardware circuitry. Each core 1002 includes control unit circuitry 1014, arithmetic and logic (AL) circuitry (sometimes referred to as an ALU) 1016, a plurality of registers 1018, the L1 cache 1020, and an example second bus 1022. Other structures may be present. For example, each core 1002 may include vector unit circuitry, single instruction multiple data (SIMD) unit circuitry, load/store unit (LSU) circuitry, branch/jump unit circuitry, floating-point unit (FPU) circuitry, etc. The control unit circuitry 1014 includes semiconductor-based circuits structured to control (e.g., coordinate) data movement within the corresponding core 1002. The AL circuitry 1016 includes semiconductor-based circuits structured to perform one or more mathematic and/or logic operations on the data within the corresponding core 1002. The AL circuitry 1016 of some examples performs integer based operations. In other examples, the AL circuitry 1016 also performs floating point operations. In yet other examples, the AL circuitry 1016 may include first AL circuitry that performs integer based operations and second AL circuitry that performs floating point operations. In some examples, the AL circuitry 1016 may be referred to as an Arithmetic Logic Unit (ALU). The registers 1018 are semiconductor-based structures to store data and/or instructions such as results of one or more of the operations performed by the AL circuitry 1016 of the corresponding core 1002. For example, the registers 1018 may include vector register(s), SIMD register(s), general purpose register(s), flag register(s), segment register(s), machine specific register(s), instruction pointer register(s), control register(s), debug register(s), memory management register(s), machine check register(s), etc. The registers 1018 may be arranged in a bank as shown in FIG. 10. Alternatively, the registers 1018 may be organized in any other arrangement, format, or structure including distributed throughout the core 1002 to shorten access time. The second bus 1020 may implement at least one of an I2C bus, a SPI bus, a PCI bus, or a PCIe bus Each core 1002 and/or, more generally, the microprocessor 1000 may include additional and/or alternate structures to those shown and described above. For example, one or more clock circuits, one or more power supplies, one or more power gates, one or more cache home agents (CHAs), one or more converged/common mesh stops (CMSs), one or more shifters (e.g., barrel shifter(s)) and/or other circuitry may be present. The microprocessor 1000 is a semiconductor device fabricated to include many transistors interconnected to implement the structures described above in one or more integrated circuits (ICs) contained in one or more packages. The processor circuitry may include and/or cooperate with one or more accelerators. In some examples, accelerators are implemented by logic circuitry to perform certain tasks more quickly and/or efficiently than can be done by a general purpose processor. Examples of accelerators include ASICs and FPGAs such as those discussed herein. A GPU or other programmable device can also be an accelerator. Accelerators may be on-board the processor circuitry, in the same chip package as the processor circuitry and/or in one or more separate packages from the processor circuitry.

Figure 11:
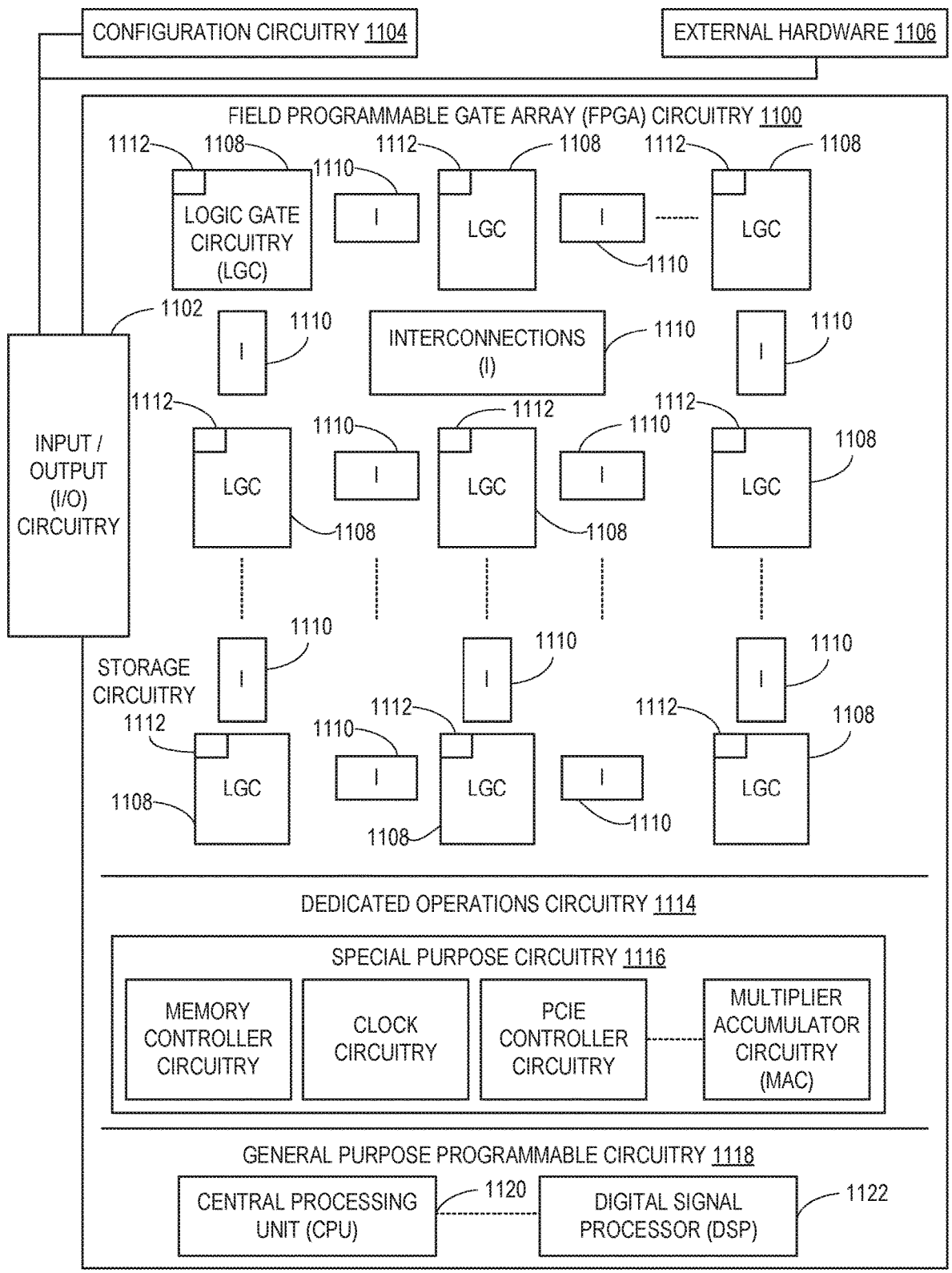
FIG. 11 is a block diagram of another example implementation of the processor circuitry of FIG. 9.

FIG. 11 is a block diagram of another example implementation of the processor circuitry 912 of FIG. 9. In this example, the processor circuitry 912 is implemented by FPGA circuitry 1100. The FPGA circuitry 1100 can be used, for example, to perform operations that could otherwise be performed by the example microprocessor 1000 of FIG. 10 executing corresponding machine readable instructions. However, once configured, the FPGA circuitry 1100 instantiates the machine readable instructions in hardware and, thus, can often execute the operations faster than they could be performed by a general purpose microprocessor executing the corresponding software.

More specifically, in contrast to the microprocessor 1000 of FIG. 10 described above (which is a general purpose device that may be programmed to execute some or all of the machine readable instructions represented by the flowchart of FIGS. 3-8 but whose interconnections and logic circuitry are fixed once fabricated), the FPGA circuitry 1100 of the example of FIG. 11 includes interconnections and logic circuitry that may be configured and/or interconnected in different ways after fabrication to instantiate, for example, some or all of the machine readable instructions represented by the flowchart of FIGS. 3-8 In particular, the FPGA 1100 may be thought of as an array of logic gates, interconnections, and switches. The switches can be programmed to change how the logic gates are interconnected by the interconnections, effectively forming one or more dedicated logic circuits (unless and until the FPGA circuitry 1100 is reprogrammed). The configured logic circuits enable the logic gates to cooperate in different ways to perform different operations on data received by input circuitry. Those operations may correspond to some or all of the software represented by the flowchart of FIGS. 3-8 As such, the FPGA circuitry 1100 may be structured to effectively instantiate some or all of the machine readable instructions of the flowchart of FIGS. 3-8 as dedicated logic circuits to perform the operations corresponding to those software instructions in a dedicated manner analogous to an ASIC. Therefore, the FPGA circuitry 1100 may perform the operations corresponding to the some or all of the machine readable instructions of FIGS. 3-8 faster than the general purpose microprocessor can execute the same.

In the example of FIG. 11, the FPGA circuitry 1100 is structured to be programmed (and/or reprogrammed one or more times) by an end user by a hardware description language (HDL) such as Verilog. The FPGA circuitry 1100 of FIG. 11, includes example input/output (I/O) circuitry 1102 to obtain and/or output data to/from example configuration circuitry 1104 and/or external hardware (e.g., external hardware circuitry) 1106. For example, the configuration circuitry 1104 may implement interface circuitry that may obtain machine readable instructions to configure the FPGA circuitry 1100, or portion(s) thereof. In some such examples, the configuration circuitry 1104 may obtain the machine readable instructions from a user, a machine (e.g., hardware circuitry (e.g., programmed or dedicated circuitry) that may implement an Artificial Intelligence/Machine Learning (AI/ML) model to generate the instructions), etc. In some examples, the external hardware 1106 may implement the microprocessor 1000 of FIG. 10. The FPGA circuitry 1100 also includes an array of example logic gate circuitry 1108, a plurality of example configurable interconnections 1110, and example storage circuitry 1112. The logic gate circuitry 1108 and interconnections 1110 are configurable to instantiate one or more operations that may correspond to at least some of the machine readable instructions of FIGS. 3-8 and/or other desired operations. The logic gate circuitry 1108 shown in FIG. 11 is fabricated in groups or blocks. Each block includes semiconductor-based electrical structures that may be configured into logic circuits. In some examples, the electrical structures include logic gates (e.g., And gates, Or gates, Nor gates, etc.) that provide basic building blocks for logic circuits. Electrically controllable switches (e.g., transistors) are present within each of the logic gate circuitry 1108 to enable configuration of the electrical structures and/or the logic gates to form circuits to perform desired operations. The logic gate circuitry 1108 may include other electrical structures such as look-up tables (LUTs), registers (e.g., flip-flops or latches), multiplexers, etc.

The interconnections 1110 of the illustrated example are conductive pathways, traces, vias, or the like that may include electrically controllable switches (e.g., transistors) whose state can be changed by programming (e.g., using an HDL instruction language) to activate or deactivate one or more connections between one or more of the logic gate circuitry 1108 to program desired logic circuits.

The storage circuitry 1112 of the illustrated example is structured to store result(s) of the one or more of the operations performed by corresponding logic gates. The storage circuitry 1112 may be implemented by registers or the like. In the illustrated example, the storage circuitry 1112 is distributed amongst the logic gate circuitry 1108 to facilitate access and increase execution speed.

The example FPGA circuitry 1100 of FIG. 11 also includes example Dedicated Operations Circuitry 1114. In this example, the Dedicated Operations Circuitry 1114 includes special purpose circuitry 1116 that may be invoked to implement commonly used functions to avoid the need to program those functions in the field. Examples of such special purpose circuitry 1116 include memory (e.g., DRAM) controller circuitry, PCIe controller circuitry, clock circuitry, transceiver circuitry, memory, and multiplier-accumulator circuitry. Other types of special purpose circuitry may be present. In some examples, the FPGA circuitry 1100 may also include example general purpose programmable circuitry 1118 such as an example CPU 1120 and/or an example DSP 1122. Other general purpose programmable circuitry 1118 may additionally or alternatively be present such as a GPU, an XPU, etc., that can be programmed to perform other operations.

Although FIGS. 10 and 11 illustrate two example implementations of the processor circuitry 912 of FIG. 9, many other approaches are contemplated. For example, as mentioned above, modern FPGA circuitry may include an on-board CPU, such as one or more of the example CPU 1120 of FIG. 6. Therefore, the processor circuitry 912 of FIG. 9 may additionally be implemented by combining the example microprocessor 1000 of FIG. 10 and the example FPGA circuitry 1100 of FIG. 11. In some such hybrid examples, a first portion of the machine readable instructions represented by the flowchart of FIGS. 3-8 may be executed by one or more of the cores 1002 of FIG. 10, a second portion of the machine readable instructions represented by the flowchart of FIGS. 3-8 may be executed by the FPGA circuitry 1100 of FIG. 11, and/or a third portion of the machine readable instructions represented by the flowchart of FIGS. 3-8 may be executed by an ASIC. It should be understood that some or all of the configuration management circuitry 120 of FIG. 2 may, thus, be instantiated at the same or different times. Some or all of the circuitry may be instantiated, for example, in one or more threads executing concurrently and/or in series. Moreover, in some examples, some or all of the configuration management circuitry 120 of FIG. 2 may be implemented within one or more virtual machines and/or containers executing on the microprocessor.

In some examples, the processor circuitry 912 of FIG. 9 may be in one or more packages. For example, the processor circuitry 1000 of FIG. 10 and/or the FPGA circuitry 1100 of FIG. 11 may be in one or more packages. In some examples, an XPU may be implemented by the processor circuitry 912 of FIG. 9, which may be in one or more packages. For example, the XPU may include a CPU in one package, a DSP in another package, a GPU in yet another package, and an FPGA in still yet another package.

Figure 12:
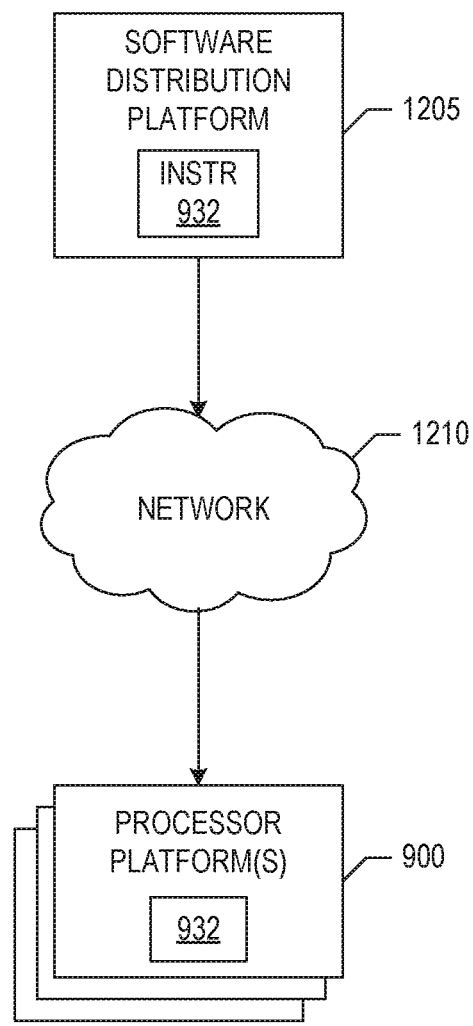
FIG. 12 is a block diagram of an example software distribution platform (e.g., one or more servers) to distribute software (e.g., software corresponding to the example machine readable instructions of FIGS. 3-8 to client devices associated with end users and/or consumers (e.g., for license, sale, and/or use), retailers (e.g., for sale, re-sale, license, and/or sub-license), and/or original equipment manufacturers (OEMs) (e.g., for inclusion in products to be distributed to, for example, retailers and/or to other end users such as direct buy customers).

A block diagram illustrating an example software distribution platform 1205 to distribute software such as the example machine readable instructions 932 of FIG. 9 to hardware devices owned and/or operated by third parties is illustrated in FIG. 12. The example software distribution platform 1205 may be implemented by any computer server, data facility, cloud service, etc., capable of storing and transmitting software to other computing devices. The third parties may be customers of the entity owning and/or operating the software distribution platform 1205. For example, the entity that owns and/or operates the software distribution platform 1205 may be a developer, a seller, and/or a licensor of software such as the example machine readable instructions 932 of FIG. 9. The third parties may be consumers, users, retailers, OEMs, etc., who purchase and/or license the software for use and/or re-sale and/or sub-licensing. In the illustrated example, the software distribution platform 1205 includes one or more servers and one or more storage devices. The storage devices store the machine readable instructions 932, which may correspond to the example machine readable instructions 300, 700, 800 of FIGS. 3-8, as described above. The one or more servers of the example software distribution platform 1205 are in communication with a network 1210, which may correspond to any one or more of the Internet and/or any of the example networks 106 described above. In some examples, the one or more servers are responsive to requests to transmit the software to a requesting party as part of a commercial transaction. Payment for the delivery, sale, and/or license of the software may be handled by the one or more servers of the software distribution platform and/or by a third party payment entity. The servers enable purchasers and/or licensors to download the machine readable instructions 932 from the software distribution platform 1205. For example, the software, which may correspond to the example machine readable instructions 300, 700, 800 of FIGS. 3-8, may be downloaded to the example processor platform 900, which is to execute the machine readable instructions 932 to implement the configuration management circuitry 120. In some example, one or more servers of the software distribution platform 1205 periodically offer, transmit, and/or force updates to the software (e.g., the example machine readable instructions 932 of FIG. 9 to ensure improvements, patches, updates, etc., are distributed and applied to the software at the end user devices.

From the foregoing, it will be appreciated that example systems, methods, and apparatus have been disclosed that reconfigure an electronic device in field to adopt to personal usage of the electronic device and/or a condition of a hardware component of the user electronic device. Disclosed systems, methods, and apparatus improve the efficiency of using a computing device by reconfiguring a computer system in-field based on a personalize workload, user profile, and/or current condition of hardware of the user device. Disclosed systems, methods, and apparatus are accordingly directed to one or more improvement(s) in the operation of a machine such as a computer or other electronic and/or mechanical device.

Example methods, apparatus, systems, and articles of manufacture to determine a location of a signal source are disclosed herein. Further examples and combinations thereof include the following:

Example 1 includes an electronic device comprising at least one memory, instructions in the electronic device, and processor circuitry to execute the instructions to analyze data corresponding to a first configuration of the electronic device to detect a change associated with the electronic device, the first configuration corresponding to a respective first user profile, determine a second configuration of the electronic device based on the detected change, and adjust a configuration of the electronic device from the first configuration to the second configuration.

Example 2 includes the electronic device of example 1, wherein the processor circuitry is to execute the instructions to generate the data corresponding to the first configuration by monitoring at least one of (a) usage of the electronic device or (b) hardware utilized by the electronic device.

Example 3 includes the electronic device of example 1, wherein the first configuration includes a plurality of first configuration settings.

Example 4 includes the electronic device of example 1, wherein the first user profile includes a corresponding first workload, the processor circuitry to execute the instructions to generate the first workload based on frequently used applications corresponding to the first user profile.

Example 5 includes the electronic device of example 1, wherein the detected change associated with the electronic device is at least one of (a) a change in usage of the electronic device from the first user profile to a second user profile or (b) a change in condition of a hardware component utilized by the electronic device.

Example 6 includes the electronic device of example 5, wherein the detected change associated with the electronic device is the change in condition of a hardware component utilized by the electronic device, the processor circuitry to execute the instructions to determine the second configuration based on the condition of the hardware component of the electronic device that changed.

Example 7 includes the electronic device of example 5, wherein the detected change associated with the electronic device is the change in usage of the electronic device from the first user profile to the second user profile, the second user profile having a second workload based on frequently used applications corresponding to the second user profile, the processor circuitry to execute the instructions to determine whether the second user profile is known by the electronic device.

Example 8 includes the electronic device of example 7, wherein the second user profile is known by the electronic device, the processor circuitry the execute the instructions to determine the second configuration of the electronic device based on a configuration associated with the second user profile.

Example 9 includes the electronic device of example 7, wherein the second user profile is not known by the electronic device, the processor circuitry to execute the instructions to determine the second configuration by adjusting a setting of the first configuration to generate a third configuration, determining performance of the electronic device based the third configuration and the second workload, and adjusting a setting of the third configuration based on the performance of the electronic device to generate the second configuration.

Example 10 includes a method comprising analyzing data corresponding to a first configuration of an electronic device to detect a change associated with the electronic device, the first configuration corresponding to a respective first user profile, determining a second configuration of the electronic device based on the detected change, and adjusting a configuration of the electronic device from the first configuration to the second configuration.

Example 11 includes the method of example 10, wherein the data corresponding to the first configuration is generated by monitoring at least one of (a) usage of the electronic device or (b) hardware utilized by the electronic device.

Example 12 includes the method of example 10, wherein the first configuration includes a plurality of first configuration settings.

Example 13 includes the method of example 10, wherein the first user profile includes a corresponding first workload, the first workload generated based on frequently used applications corresponding to the first user profile.

Example 14 includes the method of example 10, wherein the detected change associated with the electronic device is at least one of (a) a change in usage of the electronic device from the first user profile to a second user profile or (b) a change in condition of a hardware component utilized by the electronic device.

Example 15 includes the method of example 14, wherein the detected change associated with the electronic device is the change in condition of a hardware component utilized by the electronic device, the method further including determining the second configuration based on the condition of the hardware component of the electronic device that changed.

Example 16 includes the method of example 14, wherein the detected change associated with the electronic device is the change in usage of the electronic device from the first user profile to the second user profile, the second user profile having a second workload based on frequently used applications corresponding to the second user profile, the method further including determining whether the second user profile is known by the electronic device.

Example 17 includes the method of example 16, wherein the second user profile is known by the electronic device, and wherein determining the second configuration of the electronic device based on a configuration associated with the second user profile.

Example 18 includes the method of example 16, wherein the second user profile is not known by the electronic device, and wherein determining the second configuration includes adjusting a setting of the first configuration to generate a third configuration, determining performance of the electronic device based the third configuration and the second workload, and adjusting a setting of the third configuration based on the performance of the electronic device to generate the second configuration.

Example 19 includes at least one non-transitory computer readable medium comprising computer readable instructions that, when executed, cause at least one processor to at least analyze data corresponding to a first configuration of the electronic device to detect a change associated with the electronic device, the first configuration corresponding to a respective first user profile, determine a second configuration of the electronic device based on the detected change, and adjust a configuration of the electronic device from the first configuration to the second configuration.

Example 20 includes the at least one non-transitory computer readable medium of claim 19, wherein the computer readable instructions further cause the at least one processor to generate the data corresponding to the first configuration by monitoring at least one of (a) usage of the electronic device or (b) hardware utilized by the electronic device.

Example 21 includes the at least one non-transitory computer readable medium of claim 19, wherein the first configuration includes a plurality of first configuration settings.

Example 22 includes the at least one non-transitory computer readable medium of claim 19, wherein the detected change associated with the electronic device is at least one of (a) a change in usage of the electronic device from the first user profile to a second user profile or (b) a change in condition of a hardware component utilized by the electronic device.

Example 23 includes the at least one non-transitory computer readable medium of claim 22, wherein the detected change associated with the electronic device is the change in condition of a hardware component utilized by the electronic device, the computer readable instructions further cause the at least one processor to determine the second configuration based on the condition of the hardware component of the electronic device that changed.

Example 24 includes the at least one non-transitory computer readable medium of claim 22, wherein the detected change associated with the electronic device is the change in usage of the electronic device from the first user profile to the second user profile, the second user profile known by the electronic device, the computer readable instructions further cause the at least one processor to determine the second configuration of the electronic device based on a configuration associated with the second user profile.

Example 25 includes the at least one non-transitory computer readable medium of claim 22, wherein the detected change associated with the electronic device is the change in usage of the electronic device from the first user profile to the second user profile, the second user profile unknown by the electronic device, the computer readable instructions further cause the at least one processor to determine the second configuration by adjusting a setting of the first configuration to generate a third configuration, determining performance of the electronic device based the third configuration and the second workload, and adjusting a setting of the third configuration based on the performance of the electronic device to generate the second configuration.

The following claims are hereby incorporated into this Detailed Description by this reference, with each claim standing on its own as a separate embodiment of the present disclosure. Although certain example systems, methods, apparatus, and articles of manufacture have been disclosed herein, the scope of coverage of this patent is not limited thereto. On the contrary, this patent covers all systems, methods, apparatus, and articles of manufacture fairly falling within the scope of the claims of this patent.

What is claimed is:

1. An electronic device comprising:
at least one memory;
machine-readable instructions; and
at least one programmable circuit to be programmed by the machine-readable instructions to:
analyze data corresponding to a first configuration of a computer system of the electronic device to detect a change in usage of the electronic device from a first user profile to a second user profile, the first configuration corresponding to the first user profile;
determine a second configuration for the computer system of the electronic device based on the detected change from the first user profile to the second user profile, the second user profile including a second workload, the second workload based on frequently used applications corresponding to the second user profile; and adjust the computer system of the electronic device from the first configuration to the second configuration, the adjustment based on whether the second user profile is known by the electronic device.

2. The electronic device of claim 1, wherein one or more of the at least one programmable circuit is to generate the data corresponding to the first configuration by monitoring at least one of (a) the usage of the electronic device or (b) hardware utilized by the electronic device.

3. The electronic device of claim 1, wherein the first configuration includes a plurality of first configuration settings.

4. The electronic device of claim 1, wherein the first user profile includes a first workload, one or more of the at least one programmable circuit is to generate the first workload based on frequently used applications corresponding to the first user profile.

5. The electronic device of claim 1, wherein the change in the usage of the electronic device is a first change associated with the electronic device, and one or more of the at least one programmable circuit is to detect a second change associated with the electronic device, the detected second change corresponding to a change in condition of a hardware component utilized by the electronic device.

6. The electronic device of claim 5, wherein one or more of the at least one programmable circuit is to determine a third configuration for the computer system of the electronic device based on the condition of the hardware component of the electronic device that changed.

7. The electronic device of claim 1, wherein the second user profile is known by the electronic device based on the second user profile including a system configuration model, one or more of the at least one programmable circuit is to adjust the computer system of the electronic device from the first configuration to the second configuration based on the system configuration model.

8. The electronic device of claim 1, wherein the second user profile is not known by the electronic device, one or more of the at least one programmable circuit is to determine the second configuration by:
adjusting a setting of the first configuration to generate a third configuration;
determining performance of the electronic device based on the third configuration and the second workload; and
adjusting a setting of the third configuration based on the performance of the electronic device to generate the second configuration.

9. The electronic device of claim 1, wherein one or more of the at least one programmable circuit is to determine the second configuration for the computer system of the electronic device by executing an artificial intelligence model based on the second workload.

10. The electronic device of claim 1, wherein one or more of the at least one programmable circuit is to detect the change in the usage of the electronic device from the first user profile to the second user profile based on a change from a first usage type to a second usage type.

11. A method comprising:
analyzing data corresponding to a first configuration of a computer system of an electronic device to detect a change in usage of the electronic device from a first user profile to a second user profile, the first configuration corresponding to the first user profile;
determining, by executing instructions on at least one programmable circuit, a second configuration for the computer system of the electronic device based on the detected change from the first user profile to the second user profile, the second user profile including a second workload, the second workload based on frequently used applications corresponding to the second user profile; and
adjusting the computer system of the electronic device from the first configuration to the second configuration, the adjustment based on whether the second user profile is known by the electronic device.

12. The method of claim 11, wherein the data corresponding to the first configuration is generated by monitoring at least one of (a) the usage of the electronic device or (b) hardware utilized by the electronic device.

13. The method of claim 11, wherein the first configuration includes a plurality of first settings.

14. The method of claim 11, wherein the first user profile includes a first workload, the first workload generated based on frequently used applications corresponding to the first user profile.

15. The method of claim 11, wherein the detected change in the usage of the electronic device is a first change associated with the electronic device, and further including detecting a second change associated with the electronic device, the detected second change corresponding to a change in condition of a hardware component used by the electronic device.

16. The method of claim 15, further including determining a third configuration for the computer system of the electronic device based on the changed condition of the hardware component used by the electronic device.

17. The method of claim 11, wherein the second user profile is known by the electronic device based on the second user profile including a system configuration model, and the adjusting of the computer system of the electronic device is based on the system configuration model.

18. The method of claim 11, wherein the second user profile is not known by the electronic device, and the determining of the second configuration includes:
adjusting a setting of the first configuration to generate a third configuration;
determining performance of the electronic device based on the third configuration and the second workload; and
adjusting a setting of the third configuration based on the performance of the electronic device to generate the second configuration.

19. At least one non-transitory computer readable medium comprising computer readable instructions to cause at least one processor circuit to at least:
analyze data corresponding to a first configuration of a computer system of an electronic device to detect a change in usage of the electronic device from a first user profile to a second user profile, the first configuration corresponding to the first user profile;
determine a second configuration for the computer system of the electronic device based on the detected change from the first user profile to the second user profile, the second user profile including a second workload, the second workload based on frequently used applications corresponding to the second user profile; and
adjust the computer system of the electronic device from the first configuration to the second configuration, the adjustment based on whether the second user profile is known by the electronic device.

20. The at least one non-transitory computer readable medium of claim 19, wherein the computer readable instructions are to cause one or more of the at least one processor circuit to generate the data corresponding to the first configuration by monitoring at least one of (a) the usage of the electronic device or (b) hardware utilized by the electronic device.

21. The at least one non-transitory computer readable medium of claim 19, wherein the first configuration includes a plurality of first configuration settings.

22. The at least one non-transitory computer readable medium of claim 19, wherein the change in the usage of the electronic device is a first change associated with the electronic device, the computer readable instructions are to cause one or more of the at least one processor circuit to detect a second change associated with the electronic device, the second change corresponding to a change in condition of a hardware component utilized by the electronic device.

23. The at least one non-transitory computer readable medium of claim 22, wherein the computer readable instructions are to cause one or more of the at least one processor circuit to determine a third configuration for the computer system of the electronic device based on the condition of the hardware component of the electronic device that changed.

24. The at least one non-transitory computer readable medium of claim 22, wherein the computer readable instructions are to cause one or more of the at least one processor circuit to determine the second configuration of the electronic device based on a system model configuration associated with the second user profile.

25. The at least one non-transitory computer readable medium of claim 22, wherein when the second user profile is unknown by the electronic device, the computer readable instructions are to cause one or more of the at least one processor circuit to determine the second configuration by:
  adjusting a configuration setting of the first configuration to generate a third configuration;
  determining performance of the electronic device based on the third configuration and the second workload; and
  adjusting a configuration setting of the third configuration based on the performance of the electronic device to generate the second configuration.

* * * * *